(12) United States Patent
Yamazaki et al.

(10) Patent No.: US 9,857,628 B2
(45) Date of Patent: Jan. 2, 2018

(54) DISPLAY DEVICE

(71) Applicant: SEMICONDUCTOR ENERGY LABORATORY CO., LTD., Atsugi-shi, Kanagawa-ken (JP)

(72) Inventors: Shunpei Yamazaki, Tokyo (JP); Yoshiharu Hirakata, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 14/615,870

(22) Filed: Feb. 6, 2015

(65) Prior Publication Data

US 2015/0177566 A1 Jun. 25, 2015

Related U.S. Application Data

(63) Continuation of application No. 13/339,502, filed on Dec. 29, 2011, now Pat. No. 8,953,120.

(30) Foreign Application Priority Data

Jan. 7, 2011 (JP) ................................. 2011-001842

(51) Int. Cl.
| | |
|---|---|
| *G02F 1/1335* | (2006.01) |
| *G02F 1/1334* | (2006.01) |
| *G02F 1/1333* | (2006.01) |
| *G02B 27/01* | (2006.01) |

(52) U.S. Cl.
CPC ....... *G02F 1/133603* (2013.01); *G02B 27/01* (2013.01); *G02F 1/1333* (2013.01); *G02F 1/1334* (2013.01); *G02B 2027/012* (2013.01)

(58) Field of Classification Search
CPC ....... G09G 3/2085; G09G 3/20; G09G 3/3406
USPC .................... 349/74, 88, 86, 87, 89, 90, 110
See application file for complete search history.

(56) References Cited

U.S. PATENT DOCUMENTS

| | | |
|---|---|---|
| 6,037,719 A | 3/2000 | Yap et al. |
| 6,392,618 B1 | 5/2002 | Kimura |
| 6,421,160 B2 | 7/2002 | Ham |
| 6,583,915 B1 | 6/2003 | Hong et al. |
| 6,677,709 B1 | 1/2004 | Ma et al. |
| 6,943,495 B2 | 9/2005 | Ma et al. |
| 6,972,777 B2 | 12/2005 | Shigeta |

(Continued)

FOREIGN PATENT DOCUMENTS

| | | |
|---|---|---|
| EP | 1801881 A | 6/2007 |
| JP | 60-247622 A | 12/1985 |

(Continued)

*Primary Examiner* — Sang V Nguyen
(74) *Attorney, Agent, or Firm* — Nixon Peabody LLP; Jeffrey L. Costellia

(57) ABSTRACT

A display device having a light-emitting element and a see-through capability, with which a variety of display modes can be exhibited depending on a use application or situation. In such a display device having a see-through capability, between a first display portion having pixels including dual-emission type light-emitting elements and a second display portion having a light-scattering liquid crystal layer, a shutter-shaped light-blocking unit is provided so that a variety of display modes can be exhibited depending on use applications or situations by selecting modes of the first display portion, the second display portion, and the shutter-shaped light-blocking unit.

20 Claims, 11 Drawing Sheets

(56) References Cited

U.S. PATENT DOCUMENTS

| | | | |
|---|---|---|---|
| 7,251,410 B2 | 7/2007 | Ide | |
| 7,271,945 B2 | 9/2007 | Hagood et al. | |
| 7,304,785 B2 | 12/2007 | Hagood et al. | |
| 7,304,786 B2 | 12/2007 | Hagood et al. | |
| 7,365,897 B2 | 4/2008 | Hagood et al. | |
| 7,391,552 B2 | 6/2008 | Barton et al. | |
| 7,405,852 B2 | 7/2008 | Brosnihan et al. | |
| 7,417,782 B2 | 8/2008 | Hagood et al. | |
| 7,460,290 B2 | 12/2008 | Hagood, IV et al. | |
| 7,502,159 B2 | 3/2009 | Hagood, IV et al. | |
| 7,551,344 B2 | 6/2009 | Hagood, IV et al. | |
| 7,616,368 B2 | 11/2009 | Hagood, IV | |
| 7,619,806 B2 | 11/2009 | Hagood, IV et al. | |
| 7,636,189 B2 | 12/2009 | Hagood, IV et al. | |
| 7,675,665 B2 | 3/2010 | Hagood et al. | |
| 7,719,185 B2 | 5/2010 | Jin et al. | |
| 7,729,037 B2 | 6/2010 | Hagood, IV et al. | |
| 7,742,016 B2 | 6/2010 | Hagood et al. | |
| 7,742,215 B2 | 6/2010 | Hagood, IV | |
| 7,746,529 B2 | 6/2010 | Hagood et al. | |
| 7,755,582 B2 | 7/2010 | Hagood et al. | |
| RE41,673 E | 9/2010 | Ma et al. | |
| 7,800,287 B2 | 9/2010 | Zheng et al. | |
| 7,808,009 B2 | 10/2010 | Hirakata et al. | |
| 7,839,356 B2 | 11/2010 | Hagood et al. | |
| 7,852,546 B2 | 12/2010 | Fijol et al. | |
| 7,898,714 B2 | 3/2011 | Hagood, IV et al. | |
| 7,927,654 B2 | 4/2011 | Hagood et al. | |
| 7,982,385 B2 * | 7/2011 | Kimura | H01L 27/3213 313/503 |
| 7,999,759 B2 | 8/2011 | Selbrede | |
| 7,999,994 B2 | 8/2011 | Hagood, IV et al. | |
| 8,059,239 B2 | 11/2011 | Hunt | |
| 8,159,428 B2 | 4/2012 | Hagood et al. | |
| 8,169,679 B2 | 5/2012 | Wu et al. | |
| 8,310,442 B2 | 11/2012 | Hagood et al. | |
| 8,415,880 B2 * | 4/2013 | Choi | C03C 8/24 313/512 |
| 8,482,496 B2 | 7/2013 | Lewis | |
| 8,519,923 B2 | 8/2013 | Hagood, IV et al. | |
| 8,519,945 B2 | 8/2013 | Hagood et al. | |
| 8,526,096 B2 | 9/2013 | Steyn et al. | |
| 8,599,463 B2 | 12/2013 | Wu et al. | |
| 9,082,353 B2 | 7/2015 | Lewis et al. | |
| 9,087,486 B2 | 7/2015 | Gandhi et al. | |
| 9,116,344 B2 | 8/2015 | Wu et al. | |
| 9,128,277 B2 | 9/2015 | Steyn et al. | |
| 9,135,868 B2 | 9/2015 | Hagood, IV et al. | |
| 9,158,106 B2 | 10/2015 | Hagood et al. | |
| 9,176,318 B2 | 11/2015 | Hagood et al. | |
| 9,177,523 B2 | 11/2015 | Hagood et al. | |
| 9,182,587 B2 | 11/2015 | Brosnihan et al. | |
| 2001/0002703 A1 * | 6/2001 | Koyama | G09G 3/3275 257/40 |
| 2001/0028430 A1 | 10/2001 | Koma | |
| 2003/0209714 A1 | 11/2003 | Taskar et al. | |
| 2003/0227361 A1 | 12/2003 | Dickens et al. | |
| 2004/0031670 A1 | 2/2004 | Wong | |
| 2004/0075380 A1 * | 4/2004 | Takemoto | H01L 51/5259 313/500 |
| 2004/0140872 A1 | 7/2004 | Wong | |
| 2004/0169786 A1 | 9/2004 | Yamazaki et al. | |
| 2005/0024293 A1 | 2/2005 | Sakata et al. | |
| 2005/0073471 A1 | 4/2005 | Selbrede | |
| 2005/0141063 A1 * | 6/2005 | Nishino | H04N 5/23293 358/527 |
| 2005/0242713 A1 * | 11/2005 | Yamazaki | H01L 51/5284 313/503 |
| 2006/0187528 A1 * | 8/2006 | Hagood | G02B 6/0043 359/298 |
| 2006/0209012 A1 | 9/2006 | Hagood, IV | |
| 2007/0046777 A1 | 3/2007 | Song et al. | |
| 2007/0093045 A1 | 4/2007 | Yamaguchi et al. | |
| 2007/0205969 A1 | 9/2007 | Hagood, IV et al. | |
| 2007/0218630 A1 | 9/2007 | Yamaguchi et al. | |
| 2007/0228390 A1 | 10/2007 | Hattori et al. | |
| 2007/0236626 A1 | 10/2007 | Koganezawa | |
| 2007/0279727 A1 | 12/2007 | Gandhi et al. | |
| 2008/0037104 A1 | 2/2008 | Hagood et al. | |
| 2008/0158635 A1 | 7/2008 | Hagood et al. | |
| 2008/0176046 A1 | 7/2008 | Yamaguchi et al. | |
| 2008/0237005 A1 | 10/2008 | Honda | |
| 2008/0239195 A1 * | 10/2008 | Nishio | G02F 1/133308 349/58 |
| 2009/0185584 A1 | 7/2009 | Nomura et al. | |
| 2009/0201450 A1 | 8/2009 | Hatano et al. | |
| 2010/0124982 A1 * | 5/2010 | Stewart | G07F 17/3211 463/20 |
| 2010/0149469 A1 | 6/2010 | Hunt | |
| 2010/0176719 A1 * | 7/2010 | Hirakata | H01L 25/048 313/504 |
| 2010/0177170 A1 * | 7/2010 | Kusuno | 348/51 |
| 2010/0184510 A1 * | 7/2010 | Nittou | G07F 17/3211 463/30 |
| 2010/0225875 A1 * | 9/2010 | Wang | G02F 1/1339 349/160 |
| 2010/0309541 A1 | 12/2010 | Lo et al. | |
| 2011/0032450 A1 | 2/2011 | Shigeta et al. | |
| 2011/0051043 A1 | 3/2011 | Kim et al. | |
| 2011/0058120 A1 | 3/2011 | Oohira | |
| 2011/0062434 A1 * | 3/2011 | Eguchi | H01L 27/12 257/43 |
| 2011/0114969 A1 | 5/2011 | Lee et al. | |
| 2011/0122474 A1 | 5/2011 | Payne et al. | |
| 2011/0157501 A1 * | 6/2011 | Usui et al. | 349/33 |
| 2011/0267668 A1 | 11/2011 | Hagood, IV et al. | |
| 2011/0279755 A1 * | 11/2011 | Nittou | A63F 13/08 349/77 |
| 2012/0007795 A1 | 1/2012 | Selbrede | |
| 2012/0099048 A1 | 4/2012 | Yamazaki et al. | |
| 2012/0099049 A1 | 4/2012 | Yamazaki et al. | |
| 2012/0178334 A1 * | 7/2012 | Hara et al. | 445/25 |
| 2012/0280971 A1 | 11/2012 | Hagood et al. | |
| 2012/0320112 A1 | 12/2012 | Hagood, IV et al. | |
| 2012/0320113 A1 | 12/2012 | Hagood, IV et al. | |
| 2013/0010341 A1 | 1/2013 | Hagood et al. | |
| 2013/0010342 A1 | 1/2013 | Hagood, IV et al. | |
| 2013/0010344 A1 | 1/2013 | Hagood et al. | |
| 2015/0286047 A1 | 10/2015 | Lewis et al. | |
| 2015/0294613 A1 | 10/2015 | Gandhi et al. | |

FOREIGN PATENT DOCUMENTS

| | | |
|---|---|---|
| JP | 08-262438 A | 10/1996 |
| JP | 09-092909 A | 4/1997 |
| JP | 10-025975 A | 1/1998 |
| JP | 11-174994 A | 7/1999 |
| JP | 2000-023126 A | 1/2000 |
| JP | 2000-208018 A | 7/2000 |
| JP | 2001-033827 A | 2/2001 |
| JP | 2003-203549 A | 7/2003 |
| JP | 2003-217423 A | 7/2003 |
| JP | 2004-504705 | 2/2004 |
| JP | 2004-240412 A | 8/2004 |
| JP | 2004-258228 A | 9/2004 |
| JP | 2004-295141 A | 10/2004 |
| JP | 3590283 | 11/2004 |
| JP | 2004-341156 A | 12/2004 |
| JP | 2005-528751 | 9/2005 |
| JP | 2006-276089 A | 10/2006 |
| JP | 3865942 | 1/2007 |
| JP | 2007-507757 | 3/2007 |
| JP | 2007-171932 A | 7/2007 |
| JP | 2008-083510 A | 4/2008 |
| JP | 2008-112060 A | 5/2008 |
| JP | 2009-520245 | 5/2009 |
| JP | 2010-517072 | 5/2010 |
| JP | 2010-160309 A | 7/2010 |
| JP | 2012-511736 | 5/2012 |
| WO | WO-02/07482 | 1/2002 |
| WO | WO-2006/091738 | 8/2006 |
| WO | WO-2006/091791 | 8/2006 |

(56) References Cited

FOREIGN PATENT DOCUMENTS

| WO | WO-2006/091860 | 8/2006 |
| WO | WO-2006/091904 | 8/2006 |
| WO | WO-2007/075832 | 7/2007 |
| WO | WO-2007/145970 | 12/2007 |
| WO | WO-2008/091339 | 7/2008 |
| WO | WO-2009/102471 | 8/2009 |
| WO | WO-2010/005979 | 1/2010 |
| WO | WO-2010/062616 | 6/2010 |
| WO | WO-2010/066474 | 6/2010 |
| WO | WO-2011/097258 | 8/2011 |

* cited by examiner

FIG. 3A-1
110
110c
110b
110a
FIG. 3A-2
110
110c
110b
110a
FIG. 3B-1
11
11
11
11
FIG. 3B-2
110
110c
110b
110a
FIG. 3C-1
110
110c
110b
110a
FIG. 3C-2
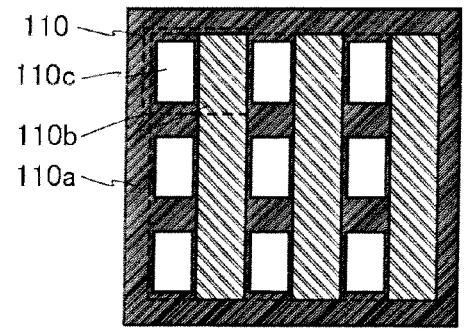
110
110c
110b
110a
FIG. 3D-1
110
110c
110b
110a
FIG. 3D-2
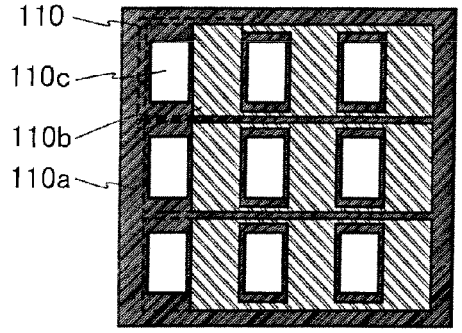
110
110c
110b
110a

300

DISPLAY DEVICE

BACKGROUND OF THE INVENTION

1. Field of the Invention

One embodiment of the present invention relates to display devices using light-emitting elements. In particular, one embodiment of the present invention relates to display devices having see-through capabilities and using light-emitting elements.

2. Description of the Related Art

In recent years, displays having see-through capabilities with which the opposite side of a display can be seen have been attracting attentions. Application fields of such displays having see-through capabilities are windshields on vehicles, windows of architectural structures such as houses and buildings, showcases and store windows of department stores, and the like.

With use of displays having see-through capabilities, a user can see an object while information on the object on the other side of a display is displayed on the display, or an object on the other side of a display can be decorated with an image for decoration displayed on the display. Further, it is thought that a mode in which the opposite side of a display can be seen, like a glass, and a mode in which an image is displayed on the display are switched as needed (for example, see Patent Document 1).

REFERENCE

[Patent Document 1] Japanese Published Patent Application No. H10-25975

SUMMARY OF THE INVENTION

However, such a display device having a see-through capability has problems in that an image of the display can be peeked from the opposite side of the display and an image displayed on the display is difficult to see due to reflection of a scene on the opposite side of the display.

According to Patent Document 1, such problems have been tried to be solved in the following manner: a light-modulating plate in which liquid crystal molecules are disordered by an interdigital comb electrode is provided for a rear side of a display and the light-modulating plate is brought into a murky white state when an image is displayed on the display.

However, only by the light-modulating plate in which liquid crystal molecules are disordered by an interdigital comb electrode provided over the rear side of the display device having a see-through capability, there is a problem in that it is difficult to display black colors with favorable contrast when such a display device having a see-through capability is manufactured using a light-emitting element typified by an organic EL element.

Moreover, as for displays having see-through capabilities, there is a demand that a transparent display mode like a glass, an image-display mode like conventional displays, and a see-through mode in which an image on the opposite side of a display can be seen be switched as appropriate depending on a use application or situation.

In view of the problems described above, among displays having light-emitting elements and see-through capabilities, it is an object to provide a display device having a light-emitting element and a see-through capability, with which a variety of display modes are possible depending on a use application or situation.

A display device having a see-through capability includes a first display portion having pixels including dual-emission type light-emitting elements, a second display portion having a light-scattering liquid crystal layer, and a shutter-shaped light-blocking unit between the first display portion and the second display portion. The first display portion has a light-transmitting property at least when the dual-emission type light-emitting element is in a non-light-emission state, while the second display portion has a light-transmitting property at least when the light-scattering liquid crystal layer is in a light-transmitting state.

One embodiment of the disclosed invention is a display device including a first support having a light-transmitting property; a first display portion having a pixel including a dual-emission type light-emitting element, provided over the first support; a second support having a light-transmitting property provided opposite to the first support; a second display portion having a light-scattering liquid crystal layer, provided over the second support so as to face the first display portion; and a plurality of shutters each including a light-blocking layer that is provided with an opening portion so as to be superposed with at least a part of the pixel and a movable light-blocking layer that is capable of blocking light passing through the opening portion, between the first display portion and the second display portion, wherein the first display portion has a light-transmitting property at least when the dual-emission type light-emitting element is in a non-light-emission state; and wherein the second display portion has a light-transmitting property at least when the light-scattering liquid crystal layer is in a light-transmitting state.

One embodiment of the disclosed invention is a display device including a first support having a light-transmitting property; a first display portion having a pixel including a dual-emission type light-emitting element, provided over the first support; a second support having a light-transmitting property provided opposite to the first support; a second display portion having a light-scattering liquid crystal layer, provided over the second support so as to be on the other side of the first display portion; a plurality of shutters each including a light-blocking layer that is provided with an opening portion so as to be superposed with at least a part of the pixel and a movable light-blocking layer that is capable of blocking light passing through the opening portion, between the first display portion and the second display portion, wherein the first display portion has a light-transmitting property at least when the dual-emission type light-emitting element is in a non-light-emission state; and wherein the second display portion has a light-transmitting property at least when the light-scattering liquid crystal layer is in a light-transmitting state.

In any of the embodiments, a background of the first display portion is preferably black display by superposing the movable light-blocking layer with the opening portion. Alternatively, the background of the first display portion is preferably white display by not superposing the movable light-blocking layer with the opening portion and making the second display portion be in a light-scattering state. Alternatively, by irradiating the background of the first display portion with incident light from a rear side of the second support, information on the object on the other side of the second support is preferably displayed on the background of the first display portion in the case where the movable light-blocking layer is not superposed with the opening portion and the second display portion is in a light-transmitting state.

In any of the embodiments, preferably, the plurality of pixels each has the movable light-blocking layer. Alternatively, the plurality of pixels and the plurality of shutters may be provided in matrix, and light of the plurality of pixels aligned in a column direction may be blocked by one movable light-blocking layer. Alternatively, the plurality of pixels and the plurality of shutters may be provided in matrix, and light of the plurality of pixels aligned in a row direction may be blocked by one movable light-blocking layer.

Another embodiment of the disclosed invention is a display device including a first support having a light-transmitting property; a first display portion having a first pixel including a dual-emission type light-emitting element, provided over the first support; a second support having a light-transmitting property provided opposite to the first support; a second display portion having a second pixel including a light-scattering liquid crystal layer, provided over the second support so as to face the first display portion; and a plurality of shutters each including a light-blocking layer that is provided with an opening portion so as to be superposed with at least parts of the first pixel and the second pixel and a movable light-blocking layer that is capable of blocking light passing through the opening portion, between the first display portion and the second display portion, wherein the first display portion has a light-transmitting property at least when the dual-emission type light-emitting element is in a non-light-emission state; and wherein the second display portion has a light-transmitting property at least when the light-scattering liquid crystal layer is in a light-transmitting state.

In any of the embodiments, preferably, the plurality of first pixels and the plurality of second pixels are each provided with one movable light-blocking layer. Alternatively, the plurality of first pixels, the plurality of second pixels, and the plurality of shutters may be provided in matrix, and light of the plurality of first pixels and light of the plurality of second pixels aligned in a column direction may be blocked by one movable light-blocking layer. Alternatively, the plurality of first pixels, the plurality of second pixels, and the plurality of shutters may be provided in matrix, and light of the plurality of first pixels and light of the plurality of second pixels aligned in a row direction may be blocked by one movable light-blocking layer.

In any of the embodiments, preferably, different image are displayed on the first display portion and the second display portion by superposing the movable light-blocking layer with the opening portion. Alternatively, preferably, the second display portion conducts color display by not superposing the movable light-blocking layer with the opening portion and using the first display portion as a backlight of the second display portion.

In any of the embodiments, the dual-emission type light-emitting element is preferably an organic EL element. Further, the light-scattering liquid crystal layer preferably includes a polymer dispersed liquid crystal material. Furthermore, the plurality of shutters are preferably formed by MEMS.

In a display device having a see-through capability, between a first display portion having pixels including dual-emission type light-emitting elements and a second display portion having a light-scattering liquid crystal layer, a shutter-shaped light-blocking unit is provided so that a variety of display modes can be exhibited depending on use applications or situations by selecting modes of the first display portion, the second display portion, and the shutter-shaped light-blocking unit.

BRIEF DESCRIPTION OF THE DRAWINGS

In the accompanying drawings:

FIGS. 3A-1 to 3D-2 are each a plan view illustrating a MEMS structure in a display device according to one embodiment of the present invention;

DETAILED DESCRIPTION OF THE INVENTION

Figure 1:
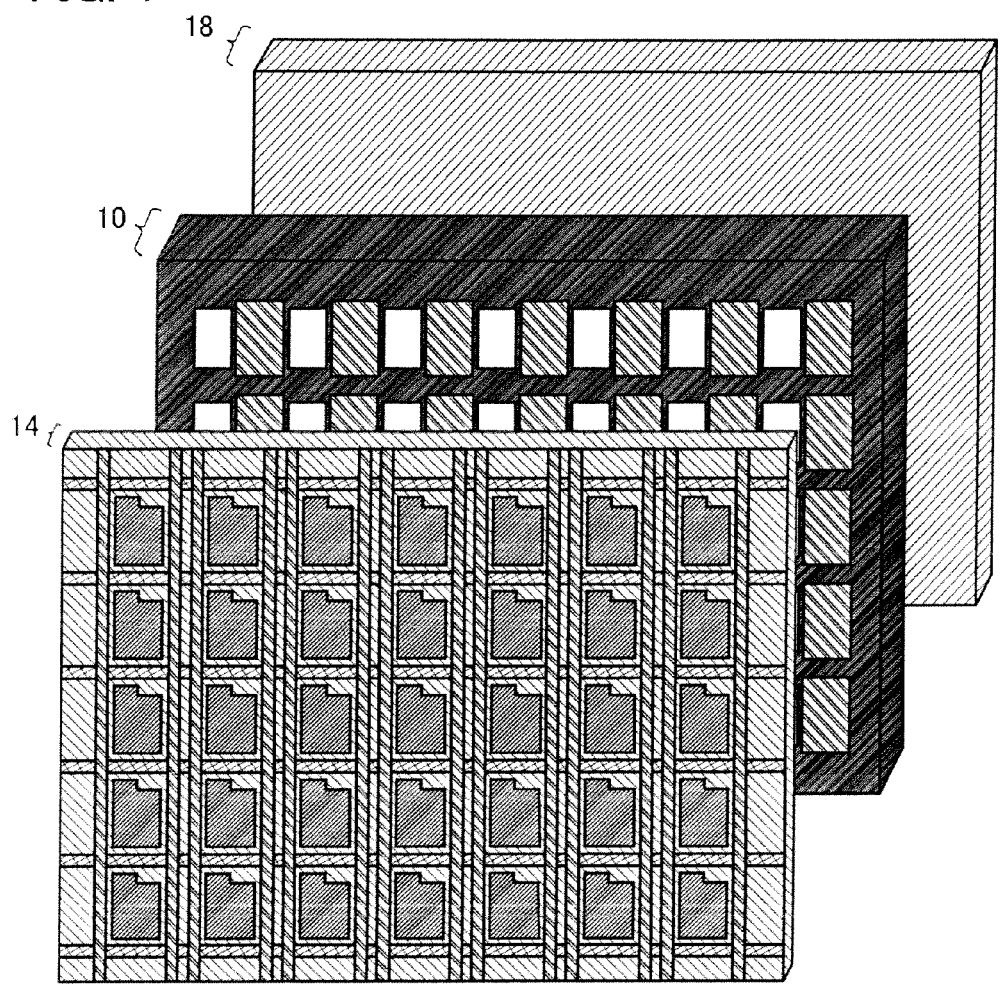
FIG. 1 is an oblique drawing illustrating a display device according to one embodiment of the present invention.

Embodiments of the present invention will be described below with reference to the accompanying drawings. Note that the invention is not limited to the following description, and it will be easily understood by those skilled in the art that various changes and modifications can be made without departing from the spirit and scope of the invention. Therefore, the invention should not be construed as being limited to the description in the following embodiments. Note that in structures of the invention described hereinafter, like portions or portions having similar functions are denoted by the same reference numerals in different drawings, and description thereof is not repeated.

Note that in each drawing described in this specification, the size, the layer thickness, or the region of each component is exaggerated for clarity in some cases. Therefore, embodiments of the present invention are not limited to such scales.

Note that terms such as "first", "second", and "third" in this specification are used in order to avoid confusion among components, and the terms do not limit the components numerically. Therefore, for example, the term "first" can be replaced with the term "second", "third", or the like as appropriate.

Embodiment 1

In this embodiment, a display device having a see-through capability according to one embodiment of the disclosed invention will be described with reference to FIG. 1, FIGS. 2A to 2C, and FIGS. 3A-1, 3A-2, 3B-1, 3B-2, 3C-1, 3C-2, and 3D-1, 3D-2.

FIG. 1 is an oblique drawing schematically illustrating a structure of a display device having a see-through capability according to one embodiment of the disclosed invention. The display device illustrated in FIG. 1 includes a first display portion 14 having pixels including dual-emission type light-emitting elements, a second display portion 18 having a light-scattering liquid crystal layer, and a shutter-shaped light-blocking unit 10 between the first display portion 14 and the second display portion 18. The first display portion 14 has a light-transmitting property at least when the dual-emission type light-emitting element is in a non-light-emission state, while the second display portion 18 has a light-transmitting property at least when the light-scattering liquid crystal layer is in a light-transmitting state.

The first display portion 14 functions as a light-emitting display device with a see-through capability, using dual-emission type light-emitting elements, and in each pixel, a light-emission state and a non-light-emission state can be switched.

The second display portion 18 functions as a liquid crystal display device using a light-scattering liquid crystal layer, and can switch between a nontransparent scattered state and a light-transmitting state.

The shutter-shaped light-blocking unit 10 can switch between a light-blocking state and a light-transmitting state of light traveling from the first display portion 14 to the second display portion 18 and light traveling from the second display portion 18 to the first display portion 14. Note that the light-blocking unit 10 may have a mechanism capable of switching between the light-blocking state and the light-transmitting state, and for example, a shutter including a light-blocking layer having an opening portion and a movable light-blocking layer capable of blocking light passing through the opening portion can be used.

As described above, in a display device having a see-through capability, such a shutter-shaped light-blocking unit is provided between the first display portion having pixels including dual-emission type light-emitting elements and the second display portion having a light-scattering liquid crystal layer. As a result, a display device can be provided, in which modes of the first display portion, the second display portion, and the shutter-shaped light-blocking unit are selected so that a variety of display modes can be easily operated depending on the usage or situation.

In addition, specific structures of the first display portion 14, the second display portion 18, and the light-blocking unit 10 are described later with reference to FIGS. 2A to 2C and FIGS. 3A-1, 3A-2, 3B-1, 3B-2, 3C-1, 3C-2, and 3D-1, 3D-2. Note that the first display portion 14 in FIG. 1 is illustrated as an active matrix light-emitting display device; however, the first display portion 14 is not limited to the illustrated example. In addition, in the illustrated example of the shutter-shaped light-blocking unit 10 in FIG. 1, a light-blocking unit is provided so as to correspond to a pixel of the first display portion 14; however, the shutter-shaped light-blocking unit 10 is not limited to the illustrated example.

Next, a structure example and a display mode of the display device having a see-through capability illustrated in FIG. 1 will be described with reference to FIGS. 2A to 2C and FIGS. 3A-1, 3A-2, 3B-1, 3B-2, 3C-1, 3C-2, and 3D-1, 3D-2.

Figure 2A:
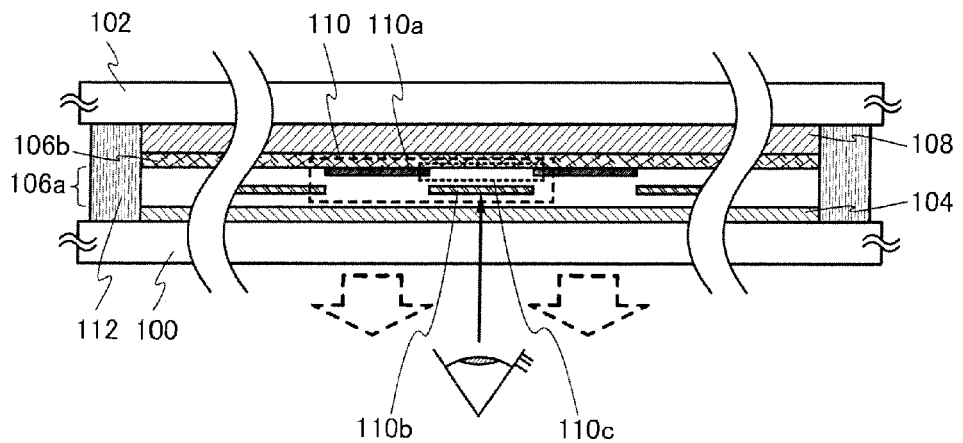
FIGS. 2A to 2C are cross-sectional views each illustrating a display device according to one embodiment of the present invention.
Figure 2B:
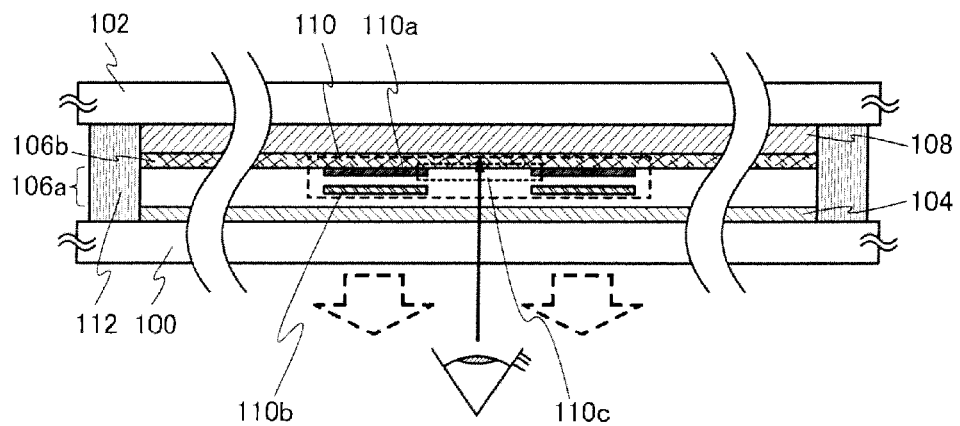
Figure 2C:
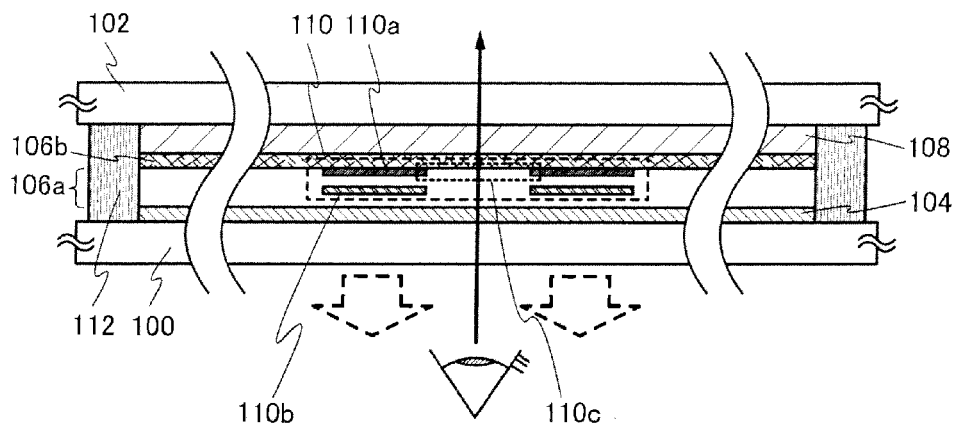

Each of FIG. 2A to FIG. 2C is a cross-sectional view of a display device having a see-through capability according to one embodiment of the disclosed invention, and illustrates a display mode in which a human being sees an image on the side of the first display portion 104. FIG. 2A illustrates a display mode in which a background of the first display portion 104 is black (a black display mode); FIG. 2B illustrates a display mode in which the background of the first display portion 104 is white (a white display mode); and FIG. 2C illustrates a display mode in which the other side of the background of the first display portion 104 is seen (a see-through display mode).

First, the structure of the display device illustrated in FIG. 2A to FIG. 2C is described. The display device illustrated in FIG. 2A to FIG. 2C includes a first support having a light-transmitting property 100, the first display portion 104 having dual-emission type light-emitting elements provided in the first support 100, a second support having a light-transmitting property 102 provided opposite to the first support 100, the second display portion 108 having a light-scattering liquid crystal layer and being provided over the second support 102 so as to be opposite to the first display portion 104; and a shutter 110 including a light-blocking layer 110a and a movable light-blocking layer 110b provided between the first display portion 104 and the second display portion 108. The first display portion 104 has a light-transmitting property at least when the dual-emission type light-emitting elements are in a non-light-emission state, and the second display portion 108 has a light-transmitting property at least when the light-scattering liquid crystal layer is in a light-transmitting state. A space between the first support 100 and the second support 102 is sealed with a sealant 112.

Here, the first display portion 104, the shutter 110, and the second display portion 108 correspond to the first display portion 14, the light-blocking unit 10, and the second display portion 18 illustrated in FIG. 1, respectively.

The first support 100 and the second support 102 can each be a substrate having a light-transmitting property. For example, a glass substrate, a ceramic substrate, or the like can be used. In addition, the first support 100 and the second support 102 can each be a substrate having a light-transmitting property and flexibility, e.g., a plastic substrate. As the plastic substrate, a fiberglass-reinforced plastics (FRP) plate, a polyvinyl fluoride (PVF) film, a polyester film, or an acrylic resin film can be used. In addition, a sheet with a structure in which an aluminum foil is sandwiched between PVF films or polyester films can be used.

The first display portion 104, corresponding to the first display portion 14 in FIG. 1, includes a plurality of pixels, in each of which at least one dual-emission type light-emitting element is formed. As a light-emitting element, an element using electroluminescence can be used, and there are an organic electroluminescent (EL) element and an inorganic EL element which are classified based on their light-emitting materials. Note that in this specification and the like, the term "dual emission" means a light-emitting method in which light of a light-emitting element is taken out through both an anode and a cathode of the light-emitting element.

In an organic EL element, by application of voltage to a light-emitting element, electrons and holes are separately injected from a pair of electrodes into a layer containing a light-emitting organic compound, and current flows. The carriers (electrons and holes) are recombined, and thus, the light-emitting organic compound is excited. The light-emitting organic compound returns to a ground state from the excited state, thereby emitting light. Owing to this mechanism, such a light-emitting element is referred to as a current-excitation light-emitting element.

On the other hand, the inorganic EL elements are classified, according to their element structures, into a dispersion type inorganic EL element and a thin-film type inorganic EL element. A dispersion-type inorganic EL element has a light-emitting layer where particles of a light-emitting material are dispersed in a binder, and its light emission mechanism is donor-acceptor recombination type light emission that utilizes a donor level and an acceptor level. A thin-film inorganic EL element has a structure where a light-emitting layer is sandwiched between dielectric layers, which are further sandwiched between electrodes, and its light emission mechanism is localized type light emission that utilizes inner-shell electron transition of metal ions.

Note that in the description of this embodiment, an organic EL element is used as a light-emitting element. An organic EL element is formed in such a way that an electroluminescent layer is formed between a cathode and an anode. Here, the thickness of the electroluminescent layer provided between the cathode and the anode is from 10 nm to 1000 nm, preferably from 100 nm to 400 nm. The electroluminescent layer may be formed using a single layer or a plurality of layers stacked. In a case where the electroluminescent layer has a plurality of layer, for example, a cathode, an electron-injection layer, an electron-transport layer, a light-emitting layer, a hole-transport layer, a hole-injection layer, and an anode are stacked in this order. It is not necessary to form all of these layers.

A conductive film used for each of the cathode and the anode is preferably a light-transmitting conductive film, and for the light-transmitting conductive film, a conductive oxide can be used, such as zinc oxide, indium oxide including tungsten oxide, indium zinc oxide including tungsten oxide, indium oxide including titanium oxide, indium tin oxide including titanium oxide, indium tin oxide (hereinafter referred to as ITO), indium zinc oxide (hereinafter, also referred to as IZO), or indium tin oxide to which silicon oxide is added can be used. Alternatively, a metal film having a thickness small enough to transmit light (the thickness is preferably about 5 nm to 30 nm) can be used as a light-transmitting conductive film. In particular, a conductive material used for the cathode preferably has a low work function, and thus, for example, a film of Ca, Al, CaF, MgAg, AlLi, or the like is preferably formed to have such a thickness. In addition, such a metal film may be stacked over the above-described conductive oxide. Further, the other parts than the light-emitting element in the first display portion 104 have a light-transmitting property so that the whole first display portion 104 can have a light-transmitting property at least in a non-light-emission state.

In addition, a protective film may be formed over the organic EL element so that oxygen, hydrogen, moisture, carbon dioxide, and the like cannot intrude into the organic EL element. As the protective film, a silicon nitride film, a silicon nitride oxide film, a diamond like carbon (DLC) film, or the like can be formed.

In addition, the first display portion 104 may be a passive matrix one, or an active matrix one in which driving of a light-emitting element is controlled by a transistor such as a TFT. In either case, wirings electrically connected to pixels should be provided in a grid pattern. In view of increase of an aperture ratio, a conductive film serving as a wiring of the first display portion is preferably a light-transmitting conductive material, and any of the above-described light-transmitting conductive materials for the cathode and the anode can be used. Note that when the conductivity of the wiring is desirably increased, a metal element selected from the group consisting of aluminum, chromium, copper, tantalum, titanium, molybdenum, tungsten, manganese, and zirconium; an alloy containing any of these metal elements as a component; an alloy containing any of these metal elements in combination; or the like can be used.

When the first display portion 104 is an active matrix one, a transistor is preferably formed using a material having a light-transmitting property. A light-transmitting semiconductor film used for such a transistor is preferably an oxide semiconductor film. As the oxide semiconductor film, a four-component metal oxide such as an In—Sn—Ga—Zn-based metal oxide, a three-component metal oxide such as an In—Ga—Zn-based metal oxide, an In—Sn—Zn-based metal oxide, an In—Al—Zn-based metal oxide, a Sn—Ga—Zn-based metal oxide, an Al—Ga—Zn-based metal oxide, or a Sn—Al—Zn-based metal oxide, a two-component metal oxide such as an In—Zn-based metal oxide or a Sn—Zn-based metal oxide, or the like can be used.

The oxide semiconductor film used for the active layer of the transistor is preferably an oxide semiconductor film highly purified to be electrically i-type (intrinsic) by heat treatment by which impurities such as hydrogen, moisture, a hydroxyl group, or a hydride (also referred to as a hydrogen compound) are removed from the oxide semiconductor and oxygen which is a major constituent of the oxide semiconductor and is reduced concurrently with the step of removing impurities is supplied. The transistor including the oxide semiconductor film highly purified in such a manner has electric characteristics which are less likely to vary, and thus is electrically stable.

Details of the structure example of the first display portion 104 are described in another embodiment below.

The second display portion 108 corresponding to the second display portion 18 in FIG. 1 has a light-scattering liquid crystal layer which conducts white display (bright display) utilizing light scattered by liquid crystal grains. For example, a polymer dispersed liquid crystal (PDLC) or a polymer network liquid crystal (PNLC) is used for such a light-scattering liquid crystal. The liquid crystal layer using such a liquid crystal has a structure in which liquid crystal grains are dispersed in a polymer layer forming a polymer network.

Since light-scattering liquid crystals are not aligned in advance and do not polarize incident light, an alignment film and a polarizing plate are not necessarily provided. Accordingly, since there is no need that an alignment film and a polarizing plate are provided in the second display portion 108 using the light-scattering liquid crystal described above, light is not absorbed by the alignment film and the polarizing plate; thus, a bright display screen with higher luminance can be obtained. Therefore, light of the second display portion 108 can be utilized efficiently, which can lead to low power consumption.

In the second display portion 108, the light-scattering liquid crystal layer is provided so as to be sandwiched between the light-transmitting conductive films and thus a liquid crystal element is formed. Here, as such light-transmitting conductive films, a similar one to the conductive films used for the cathode and the anode of the organic EL element in the first display portion 104 can be used. Further, the other parts than the liquid crystal element in the second display portion 108 are made to have a light-transmitting property so that the whole second display portion 108 can have a light-transmitting property at least when the light-scattering liquid crystal layer is in a light-transmitting state.

In the light-scattering liquid crystal layer, in the case of applying no voltage between the conductive films provided at the top and bottom surfaces thereof (also referred to as an off state), the liquid crystal grains dispersed in the polymer layer are oriented in a random manner to cause a difference between the refractive index of the polymer and the refractive index of the liquid crystal molecule, and incident light is thus scattered by the liquid crystal grains to make the liquid crystal layer opaque and clouded. Therefore, the display which can be confirmed on the viewing side will be also white display.

On the other hand, in the case of applying voltage between the conductive films provided at the top and bottom surfaces thereof (also referred to as an on state), an electric field is generated in the light-scattering liquid crystal layer, and the liquid crystal molecules in the liquid crystal grains are oriented in the direction of the electric field such that the refractive index of the polymer substantially corresponds with the refractive index in the short axis of the liquid crystal molecule. Thus, incident light is transmitted through the liquid crystal layer without being scattered by the liquid crystal grains. Therefore, the liquid crystal layer transmits light and is in a transparent state. In the case where the liquid crystal layer is in a light-transmitting state, display that can be recognized on the viewing side depends on materials provided over the front and back sides of the liquid crystal layer.

Note that the second display portion 108 in this embodiment includes the liquid crystal layer having a light-scattering property and the light-transmitting conductive films provided at the top and the bottom surfaces of the liquid crystal layer. The light-transmitting conductive films are substantially formed in uniform shape over a surface of the second support 102 provided opposite to the first support 100. In other words, no pixels are provided in the second display portion 108, but the second display portion 108 is not limited to that structure. The following structure may be employed: the light-transmitting conductive films provided at the top and the bottom surfaces of the liquid crystal layer are divided in the row direction and the column direction so as to serve as pixel electrodes, and a plurality of pixels are provided in the second display portion 108.

Details of the structure example of the second display portion 108 will be described in another embodiment below.

A shutter-shaped light-blocking unit which is openable and closable is provided between the first display portion 104 and the second display portion 108. In the display device illustrated in FIG. 2A to FIG. 2C, the shutter 110 including the light-blocking layer 110a and the movable light-blocking layer 110b corresponds to the shutter-shaped light-blocking unit 10 in FIG. 1.

The shutter 110 is preferably formed with use of MEMS (Micro Electro Mechanical Systems). In the display device illustrated in FIG. 2A to FIG. 2C, a MEMS structure portion 106a and a MEMS driving element portion 106b are provided between the first display portion 104 and the second display portion 108. The MEMS structure portion 106a has a three-dimensional structure and a plurality of shutters 110, a part of which is movable and which is a micro structure. The shutter 110 has the light-blocking layer 110a provided with an opening portion 110c, and has the movable light-blocking layer 110b capable of blocking light passing through the opening portion 110c. At least a part of the opening portion 110c is provided to be superposed with a pixel provided in the first display portion 104.

The shutter 110 blocks light passing through the opening portion 110c by superposing the movable light-blocking layer 110b with the opening portion 110c, and allows light to pass through the opening portion 110c by moving the movable light-blocking layer 110b so as not to superpose with the opening portion 110c. Examples of the shutters 110 provided in matrix are illustrated in the plan views of FIGS. 3A-1, 3A-2, 3B-1, 3B-2, 3C-1, 3C-2, and 3D-1, 3D-2.

The shutter 110 illustrated in FIG. 3A-1 and FIG. 3A-2 has one movable light-blocking layer 110b which can be slid to each opening portion 110c of the light-blocking layer 110a in the row direction. In a case where the opening portion 110c is provided for each pixel in the first display portion 104, each pixel has one movable light-blocking layer 110b.

FIG. 3A-1 illustrates a mode in which the shutters 110 are closed, whereas FIG. 3A-2 illustrates a mode in which some of the shutters 110 are open and the others of the shutters 110 are closed. As illustrated in FIG. 3A-1 and FIG. 3A-2, in each opening portion 110c, one movable light-blocking layer 110b is provided, so that opening or closing of the shutter 110 can be selected for each opening portion 110c, and when the opening portion 110c is provided for each pixel in the first display portion 104, opening or closing of the shutter 110 can be selected for each pixel. Note that in FIG. 3A-2, some of the shutters 110 are open; however, needless to say, all of the shutters 110 may be open.

In FIG. 3A-1 and FIG. 3A-2, the shapes of the movable light-blocking layer 110b and the opening portion 110c are rectangular, but not limited thereto, and may be a circle, an ellipse, a polygon, or the like.

In addition, the movable light-blocking layer 110b and the opening portion 110c may be slit-shaped. A mode in which the movable light-blocking layer 110b and the opening portion 110c of the shutter 110 illustrated in FIG. 3A-1 and FIG. 3A-2 are slit-shaped is illustrated in FIG. 3B-1 and FIG. 3B-2. A space where the movable light-blocking layer 110b can move is determined depending on the width of the sliding direction (the row direction) of the movable light-blocking layer 110b in the opening portion 110c. Therefore, as illustrated in FIG. 3B-1 and FIG. 3B-2, the width in the row direction of the opening portion 110c is narrowed, so that the space where the movable light-blocking layer 110b can move can be small. In this manner, the occupied area per shutter 110 can be made small, which can lead to the higher aperture ratio of the MEMS structure portion 106a. In addition, power consumed for opening and closing of the shutter 100 can be reduced. Further, in a case where the opening portion 110c is provided for each pixel of the first display portion 104, more pixels can be formed in an integrated manner.

In addition, one movable light-blocking layer 110b may be used to block light passing through a plurality of opening portions 110c aligned in the direction (the column direction) perpendicular to the sliding direction of the movable light-blocking layer 110b. A mode in which the movable light-blocking layer 110b of the shutter 110 illustrated in FIG. 3A-1 and FIG. 3A-2 is elongated in the column direction is illustrated in FIG. 3C-1 and FIG. 3C-2.

Alternatively, one movable light-blocking layer 110b may be used to block light passing through the plurality of opening portion 110c aligned in the slid direction (the row direction) of the movable light-blocking layer 110b. FIG. 3D-1 and FIG. 3D-2 illustrate a mode in which the movable light-blocking layer 110b of the shutter 110 in FIG. 3A-1 and FIG. 3A-2 is elongated in the row direction.

Note that the shapes and the like of the movable light-blocking layer 110b and the opening portion 110c illustrated in FIGS. 3A-1, 3A-2, 3B-1, 3B-2, 3C-1, 3C-2, and 3D-1, 3D-2 can be combined as appropriate.

For the light-blocking layer 110a or the movable light-blocking layer 110b, a material having a light-blocking property is used. For example, a metal such as chromium, molybdenum, nickel, titanium, copper, tungsten, tantalum, neodymium, aluminum, or silicon, or an alloy or an oxide thereof can be used.

In addition, the MEMS structure portion 106a and the shutter 110 include an actuator for sliding the movable light-blocking layer 110b parallel with the substrate surface, a structure supporting the movable light-blocking layer 110b, and the like, in addition to the light-blocking layer 110a and the movable light-blocking layer 110b. Details of the structure example of the shutter 110 are described in another embodiment below.

In addition, a transistor for driving the movable light-blocking layer 110b by the actuator is formed in the MEMS driving element portion 106b. The transistor used for the MEMS driving element portion 106b is preferably formed using a material having a light-transmitting property and can be a similar one to the transistor used in the first display portion 104. In addition, a conductive film used for a wiring in the MEMS driving element portion 106b is preferably a light-transmitting conductive material, and can be a similar one to the wiring used in the first display portion 104.

Note that in FIG. 2A to FIG. 2C, the MEMS structure portion 106a and the MEMS driving element portion 106b are distinguished clearly; however, the display device described in this embodiment is not necessarily limited to that mode. For example, between the light-blocking layer 110a and the movable light-blocking layer 110b, a transistor for driving the movable light-blocking layer 110b and a wiring used for driving the transistor may be provided.

As the sealant 112, it is typically preferable to use visible light curable, ultraviolet curable, or heat curable resin. Typically, an acrylic resin, an epoxy resin, an amine resin, or the like can be used. Further, a photopolymerization initiator (typically, an ultraviolet light polymerization initiator), a thermosetting agent, a filler, or a coupling agent may be included.

The space sealed with the first support 100, the second support 102, and the sealant 112 is filled with a filler. As the filler, an inert gas such as nitrogen or argon can be used. As a result of filling the space with a filler, the organic EL element, the shutter 110, and the like can be prevented from deteriorating due to oxygen, hydrogen, moisture, carbon dioxide, or the like.

In addition, the space sealed with the first support 100, the second support 102, and the sealant 112 may be provided with a columnar or spherical spacer so that the height of the space can be controlled. Note that the columnar or spherical spacer should not interfere with the movable light-blocking layer 110b of the shutter 110.

Next, a display mode, that is, a mode in which an image can be seen from the first display portion 104 side illustrated in FIG. 2A to FIG. 2C, is described.

The display mode in FIG. 2A seen from the first display portion 104 side is a display mode in which the background of the first display portion 104 is black display (dark display). In the display mode, the movable light-blocking layer 110b of the shutter 110 is superposed with the opening portion 110c of the light-blocking layer 110a, so that light from the second support 102 side is blocked in the opening portion 110c. Therefore, light that can be seen from the first display portion 104 side is light only emitted from the first display portion 104. At this time, almost no light is emitted from pixels in non-light-emission state in the first display portion 104, and thus the pixels in non-light-emission state make black display.

Note that in this specification and the like, the term "black display" means display made by pixels in non-light-emission state in a state that the shutters 110 superposed with the pixels are closed. Thus, the black display does not mean that no light is emitted from the pixels. For example, there is a case where when a reflective film such as a metal film is used for the movable light-blocking layer 110b of the shutter 110, light reflected on the movable light-blocking layer 110b is slightly emitted from a pixel, and this case is included in the black display.

Note that in the display mode illustrated in FIG. 2A, the second display portion 108 may be in a light-scattering state or a light-transmitting state.

In the display mode illustrated in FIG. 2A, light passing through the opening portion 110c is blocked by the movable light-blocking layer 110b, and thus an image of the first display portion 104 can be prevented from being peeked from the second support 102 side or a scene on the second support 102 side can be prevented from being reflected on the first display portion. Further, light passing through the opening portion 110c is blocked by the movable light-blocking layer 110b, and thus excessive light can be prevented from entering a pixel in a non-light-emission state from the second support 102 side. Thus, black with good contrast can be exhibited by pixels in non-light-emission state.

The display mode seen on the first display portion 104 side, illustrated in FIG. 2B, is a display mode in which a background of the first display portion 104 is white display (bright display). In the display mode, the movable light-blocking layer 110b of the shutter 110 is not superposed with the opening portion 110c of the light-blocking layer 110a, so that the second display portion 108 is in a light-scattering state. Thus, light scattered in the second display portion 108 can be emitted to the first support 100 side through the opening portion 110c. Therefore, light that can be seen on the first display portion 104 side is light emitted in the first display portion 104 and light scattered in the second display portion 108. At this time, most of light emitted from the pixel in a non-light-emission state in the first display portion 104 becomes light scattered in the second display portion 108, so that the pixel in a non-light-emission state makes white display. In addition, light of the first display portion 104 traveling toward the second support enters the second display portion 108 through the opening portion 110c and then is scattered.

Note that in this specification and the like, the term "white display" means display made by pixels in non-light-emission state in a state that the shutters 110 superposed with the pixels are open, and the second display portion 108 is in a light-scattering state.

In the display mode illustrated in FIG. 2B, since the second display portion 108 is in a light-scattering state, an image of the first display portion 104 can be prevented from being peeked from the second support 102 side or a scene on the second support 102 side can be prevented from being reflected on the first display portion. Further, by making the second display portion 108 be in a light-scattering state, white display on the first display portion 104 side can be made without light emission of the first display portion 104, which can lead to white display with low power consumption.

The display mode seen from the first display portion 104 side, illustrated in FIG. 2C, is a display mode in which light from the other side of the second support 102 is viewed as the background of the first display portion 104, so-called see-through display mode. In the display mode, the movable light-blocking layer 110b of the shutter 110 is not superposed with the opening portion 110c of the light-blocking layer 110a, and thus the second display portion 108 is in a light-transmitting state. Therefore, incident light from the other side of the second support 102 travels through the second display portion 108 and the opening portion 110c and is emitted toward the first support 100 side. Accordingly, light viewed on the first display portion 104 side is light emitted in the first display portion 104 and incident light from the other side of the second support 102. At this time, light emitted from a pixel in a non-light-emission state in the first display portion 104 is mostly incident light from the other side of the second support 102, so that the pixel in a non-light-emission state makes see-through display. The second display portion 108 illustrated in FIG. 2C is in a light-transmitting state, differently from those illustrated in FIG. 2A and FIG. 2B, and thus is hatched differently.

Note that in this specification and the like, the term "see-through display" means a display mode in which the shutter 110 superposed with the pixel is open and which is made by pixels in a non-light-emission state when the second display portion 108 is in a light-transmitting state. Thus, the term "see-through display" does not mean that incident light from the second display portion 108 side is emitted toward the first display portion 104 side completely. For example, there is a case where incident light from the second display portion 108 side is absorbed or attenuated by the light-blocking layer 110a or the like, and this case is included in the see-through display.

In addition, in the display mode illustrated in FIG. 2C, display of the first display portion 104 can be seen on the second display portion 108 side.

In the display mode illustrated in FIG. 2C, since the second display portion 108 is in a light-transmitting state, an image of the first display portion 104 and a scene on the other side of the second support 102 can be seen at the same time. Thus, while information on an object on the other side of the second support 102 is displayed on the first display portion 104, the object can be seen or an object on the other side of the second support 102 can be decorated with an image displayed on the first display portion 104.

In the display mode illustrated in FIG. 2C, a mode in which a light-emitting element of the first display portion 104 is in a non-light-emission state is referred to as a transparent display. By the transparent display, incident light from the second support 102 side can be transmitted through the first support 100 side, and incident light from the first support 100 side can be transmitted through the second support 102 side. In other words, the display device can be used, like a window glass. Note that the term "transparent display" includes a case where incident light from the first display portion 104 or the second display portion 108 side is absorbed or attenuated by the light-blocking layer 110a or the like.

Therefore, when the first display portion 104 does not emit light, the display device can be set as a light-transmitting plate, like a window glass.

In addition, the display modes illustrated in FIG. 2A to FIG. 2C can be selected for each of the pixels of the first display portion 104 or each of the shutters 110 of the MEMS structure portion 106a. For example, the black display mode in FIG. 2A and the see-through display mode in FIG. 2C can be selected for each of the pixels of the first display portion 104. In other words, in the first display portion 104, as for a pixel for light-emitting display or black display, the shutter 110 superposed with the pixel is closed, while as for a pixel for see-through display or transparent display, the shutter superposed with the pixel can be open. In this manner, when information on an object on the other side of the second support 102 can be displayed on the first display portion 104 and at the same time, the object can be seen, or an object on the other side of the second support 102 is decorated with an image displayed on the first display portion 104, a scene on the other side of the second support 102 can be prevented from being reflected on an image to be displayed on the first display portion 104 can be prevented.

As described above, in a display device having a see-through capability, the shutter-shaped light-blocking unit is provided between the first display portion having pixels including dual-emission type light-emitting elements and the second display portion having a light-scattering liquid crystal layer, and thereby a display device capable of easily exhibiting a variety of display modes by selecting modes of the first display portion, the second display portion, and the shutter-shaped light-blocking unit depending on use applications or situations can be provided.

The structures and the like described in this embodiment can be combined as appropriate with any of the structures and the like described in the other embodiments.

Embodiment 2

In this embodiment, a display device having a different mode from that of the display device having a see-through capability described in Embodiment 1 will be described with reference to FIG. 4.

Figure 4:
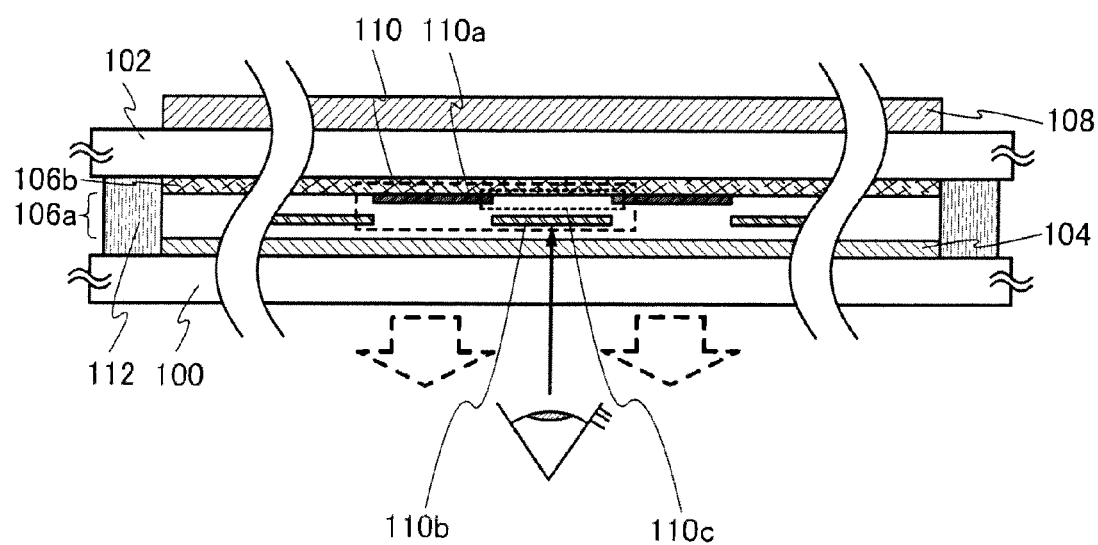
FIG. 4 is a cross-sectional view illustrating a display device according to one embodiment of the present invention.

The display device illustrated in FIG. 4 includes the first support having a light-transmitting property 100, the first display portion 104 having light-emitting elements provided for the first support 100, the second support having a light-transmitting property 102 provided opposite to the first support 100, the second display portion 108 having a light-scattering liquid crystal layer and being provided over the second support 102 so as to be opposite to the first display portion 104, and the MEMS structure portion 106a and the MEMS driving element portion 106b provided between the first display portion 104 and the second support 102. The MEMS structure portion 106a has the shutter 110 that includes the light-blocking layer 110a provided with the opening portion 110c and the movable light-blocking layer 110b capable of blocking light passing through the opening portion 110c, and the MEMS driving element portion 106b has a transistor for driving the shutter 110. A space between the first support 100 and the second support 102 is sealed with the sealant 112.

In other words, the difference between the display device illustrated in FIG. 2A to FIG. 2C and the display device illustrated in FIG. 4 is whether or not the second display portion 108 is provided between the first support 100 and the second support 102. The other structures are similar to those in the display device illustrated in FIG. 2A to FIG. 2C and thus, for details thereof, the description of the display device illustrated in FIG. 2A to FIG. 2C can be referred to.

In this embodiment, since the second display portion 108 is provided in the outside of the space sealed with the first support 100, the second support 102, and the sealant 112, a protective film is preferably formed over the second display portion 108 so that oxygen, hydrogen, moisture, carbon dioxide, or the like cannot enter the second display portion 108. As the protective film, a silicon nitride film, a silicon nitride oxide film, a diamond like carbon (DLC) film, or the like can be formed. Furthermore, it is preferable that the display device be packaged (sealed) with a protective film (such as a bonding film or an ultraviolet curable resin film)

or a cover material with high air-tightness and little degasification so that the display device is not exposed to the outside air.

Detains of the structure example of the second display portion 108 will be described in another embodiment below.

The display mode seen from the first display portion 104 side, of the display device illustrated in FIG. 4, is a display mode in which the background of the first display portion 104 is black display (dark display), but not limited to, can be any of display modes illustrated in FIG. 2A to FIG. 2C, as in Embodiment 1.

In addition, in the example of the display device illustrated in FIG. 4, the second display portion 108 is provided in the outside of the space sealed with the first support 100, the second support 102, and the sealant 112; however, this embodiment is not limited to this example. The first display portion 104 may be provided in the outside of the space, as long as a protective film or a cover material which has high airtightness and causes little degasification can be used so that the first display portion 104 cannot be exposed to air. In that case, in the structure illustrated in FIG. 2A to FIG. 2C, the first display portion 104 is provided over the first support 100 on the side that does not face with the second display portion 108, and the MEMS structure portion 106a and the MEMS driving element portion 106b are provided between the second display portion 108 and the first support 100.

The structures and the like described in this embodiment can be combined as appropriate with any of the structures and the like described in the other embodiments.

Embodiment 3

In this embodiment, a display device having a different mode from that of the display device having a see-through capability described in Embodiment 1 will be described with reference to FIG. 5A and FIG. 5B.

Figure 5A:
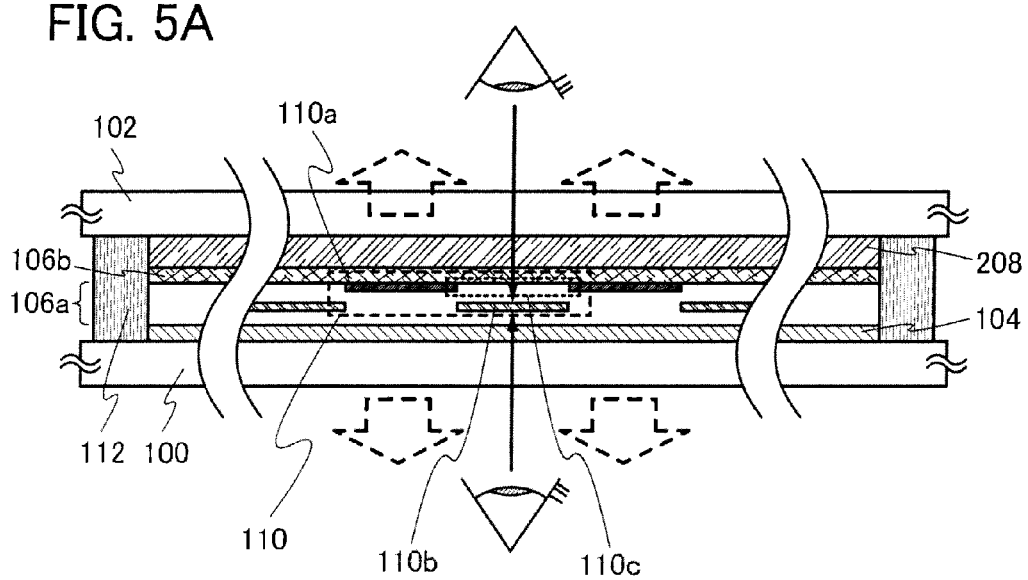
FIGS. 5A and 5B are cross-sectional views illustrating a display device according to one embodiment of the present invention.
Figure 5B:
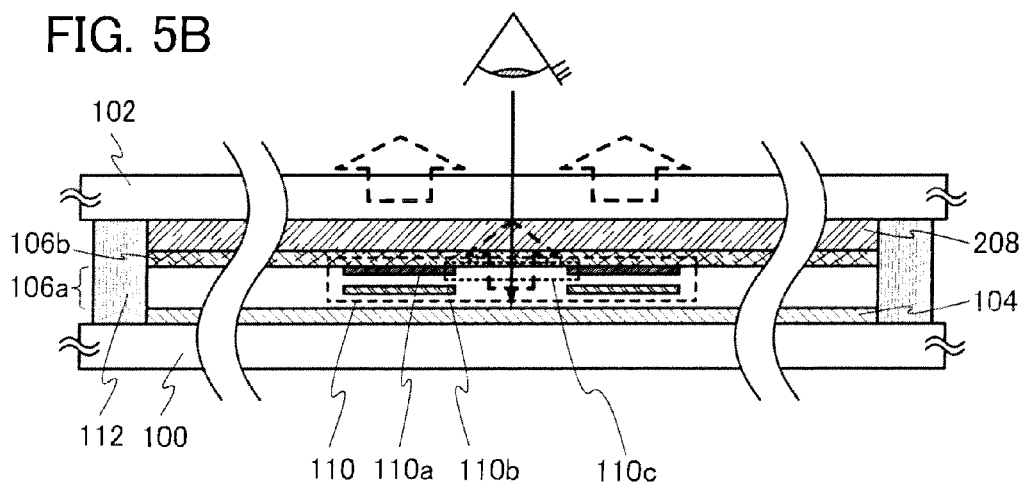

FIG. 5A and FIG. 5B are each a cross-sectional view of a display device in accordance with one embodiment of the disclosed invention. FIG. 5A illustrates a display mode in which images are displayed on both surfaces (double-sided display mode), while FIG. 5B illustrates a display mode in which the first display portion 104 is used as a backlight.

A structure of the display device illustrated in FIG. 5A and FIG. 5B is described. The display device illustrated in FIG. 5A and FIG. 5B includes the first support having a light-transmitting property 100, the first display portion 104 having light-emitting elements provided for the first support 100, the second support having a light-transmitting property 102 provided opposite to the first support 100, a second display portion 208 having a light-scattering liquid crystal layer, provided for the second support 102 so as to be opposite to the first display portion 104, and the MEMS structure portion 106a and the MEMS driving element portion 106b provided between the first display portion 104 and the second display portion 208. The MEMS structure portion 106a has the shutter 110 that includes the light-blocking layer 110a provided with the opening portion 110c and the movable light-blocking layer 110b capable of blocking light passing through the opening portion 110c, and the MEMS driving element portion 106b has a transistor for driving the shutter 110. The first display portion 104 includes a plurality of first pixels, while the second display portion 208 includes a plurality of second pixels. At least parts of the first pixels and the second pixels are superposed with the opening portion 110c of the light-blocking layer 110a. A space between the first support 100 and the second support 102 is sealed with the sealant 112.

In other words, the display device illustrated in FIG. 5A and FIG. 5B is different from the display device illustrated in FIG. 2A to FIG. 2C in that the plurality of second pixels are provided in the second display portion 208. The other structures are similar to those in the display device illustrated in FIG. 2A to FIG. 2C and for the details thereof, the description of the display device illustrated in FIG. 2A to FIG. 2C can be referred to.

The second display portion 208 in this embodiment is different from the second display portion 108 in Embodiment 1, and in this embodiment, the second display portion 208 includes a plurality of pixels formed in such a way that one of light-transmitting conductive films formed on the top and bottom surfaces of the liquid crystal layer having a light-scattering property is divided to form pixel electrodes. The second display portion 208 may be a passive matrix one or an active matrix one in which a liquid crystal element is driven by a transistor such as a TFT. In either case, wirings electrically connected to pixels should be provided in a grid pattern. A conductive film used for wirings in the second display portion can be the conductive film used for wirings in the first display portion described in the above-described embodiment, and thus for the details thereof, the description in the above-described embodiment can be referred to. In addition, when the second display portion 208 is an active matrix one, a transistor is preferably formed using a material having a light-transmitting property, and can be a similar one to the transistor used in the first display portion 104 in Embodiment 1.

Next, display modes illustrated in FIG. 5A and FIG. 5B are described. Note that the display device described in this embodiment can have display modes illustrated in FIG. 2A to FIG. 2C, as in Embodiment 1.

The display mode illustrated in FIG. 5A is a double-side display mode in which an image of the first display portion 104 can be seen on the first support 100 side, and an image of the second display portion 208 can be seen on the second support 102 side. In the display mode, the movable light-blocking layer 110b of the shutter 110 is superposed with the opening portion 110c of the light-blocking layer 110a, and thus light from the first support 100 side and light from the second support 102 side are both blocked by the shutter 110. Therefore, an image seen on the first support 100 side is only an image of the first display portion 104, and an image seen on the second support 102 side is only an image of the second display portion 208. In other words, in the display mode illustrated in FIG. 5A, different images can be displayed on the opposite surfaces of one display device.

The display mode illustrated in FIG. 5B is a display mode in which the first display portion 104 is used as a backlight of the second display portion 208. In the display mode, the movable light-blocking layer 110b of the shutter 110 is not superposed with the opening portion 110c of the light-blocking layer 110a, and the first display portion 104 is in a light-emission state. Thus, light from the first display portion 104 travels through the opening portion 110c and enters the second display portion 208. Therefore, in the first display portion 104, a light-emitting element exhibiting red (R) light, a light-emitting element exhibiting green (G) light, and a light-emitting element exhibiting blue (B) light are provided, so that a full color display can be performed, without using a coloring layer in the second display portion 208. For example, a field sequential method in which light-emitting elements for three colors, RGB, are made to emit light sequentially for switching emitted color for full-color display can be employed.

As described above, in a display device having a see-through capability, between the first display portion having a first pixel including a dual-emission type light-emitting element and the second display portion having a second pixel including a light-scattering liquid crystal layer, a shutter-shaped light-blocking unit is provided. Therefore, a display device capable of easily exhibiting a variety of display modes by selecting modes of the first display portion, the second display portion, and the shutter-shaped light-blocking unit depending on use applications or situations can be provided.

The structures and the like described in this embodiment can be combined as appropriate with any of the structure and the like described in the other embodiments Embodiment 4

In this embodiment, a structure example of the shutter provided in the display device having a see-through capability in any of the above-described embodiments will be described with reference to FIG. 6.

Figure 6:
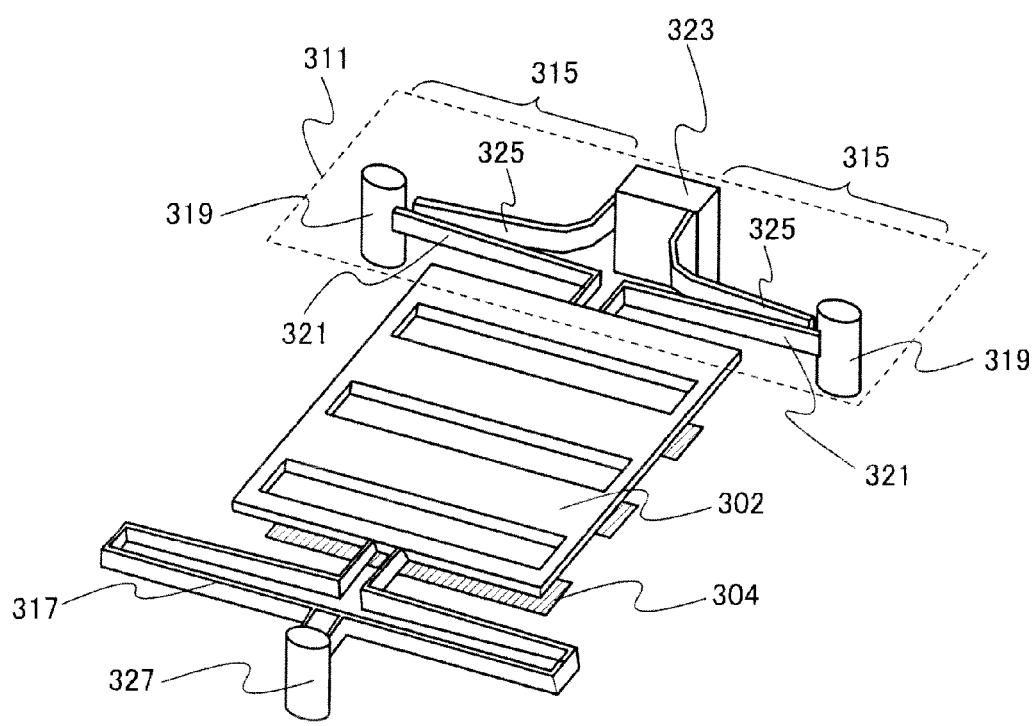
FIG. 6 is a perspective view illustrating a shutter in a display device according to one embodiment of the present invention.

FIG. 6 is a perspective view of a shutter 300. The shutter 300 includes a movable light-blocking layer 302 united with an actuator 311. The actuator 311 is provided over a light-blocking layer (not illustrated for simplification) having an opening portion 304 and has two actuators 315 having flexibility. One side of the movable light-blocking layer 302 is connected to the actuators 315. The actuators 315 have a function of moving the movable light-blocking layer 302 in a lateral direction parallel to the surface of the light-blocking layer having the opening portion 304. Note that the shutter 300 corresponds to the shutter 110 described in the above-described embodiments, the light-blocking layer having the opening portion 304 corresponds to the light-blocking layer 110a described in the above-described embodiments, the opening portion 304 corresponds to the opening portion 110c described in the above-described embodiments, and the movable light-blocking layer 302 corresponds to the movable light-blocking layer 110b described in the above-described embodiments.

The actuators 315 each include a movable electrode 321 connected to the movable light-blocking layer 302 and a structure 319, and a movable electrode 325 connected to a structure 323. The movable electrode 325 is adjacent to the movable electrode 321, and one end of the movable electrode 325 is connected to the structure 323, and the other end thereof can be freely moved. Further, the terminal portion of the movable electrode 325, which can move freely, is curved so as to be closest to a connection portion of the movable electrode 321 and the structure 319.

The other side of the movable light-Hocking layer 302 is connected to a spring 317 having restoring force to resist force applied by the actuator 311. The spring 317 is connected to a structure 327.

The structure 319, the structure 323, and the structure 327 function as mechanical supports for floating the movable light-blocking layer 302, the actuators 315, and the spring 317 in the vicinity of the surface of the light-blocking layer having the opening portion 304.

Under the movable light-blocking layer 302, the opening portions 304 surrounded by the light-blocking layer are provided. Note that in this embodiment, the shapes of the movable light-blocking layer 302 and the opening portion 304 are the shapes illustrated in FIG. 3B-1 and FIG. 3B-2, but not limited to the shapes, and can be another shape described in any of the above-described embodiments.

The structure 323 included in the shutter 300 is connected to a transistor not illustrated. The transistor is a transistor for driving the movable light-blocking layer provided in the MEMS driving element portion 106b in the above-described embodiments. Thus, a given voltage can be applied to the movable electrode 325 connected to the structure 323 through the transistor. In addition, the structure 319 and the structure 327 are each connected to a ground electrode (GND). Therefore, a potential of the movable electrode 321 connected to the structure 319 and a potential of the spring 317 connected to the structure 327 are GND. Note that the structures 319 and 327 may be electrically connected to a common electrode to which a given voltage can be applied.

When voltage is applied to the movable electrode 325, the movable electrode 321 and the movable electrode 325 are electrically drawn to each other due to a potential difference between the movable electrode 325 and the movable electrode 321. As a result, the movable light-blocking layer 302 connected to the movable electrode 321 is drawn toward the structure 323 and moves to the structure 323 in the lateral direction. Since the movable electrode 321 serves as a spring, when the potential difference between the potential of the movable electrode 321 and the potential of the movable electrode 325 is removed, the movable electrode 321 releases the stress stored in the movable electrode 321 and pushes the movable light-blocking layer 302 back to the original position. When the movable electrode 321 is drawn to the movable electrode 325, the opening portion 304 may be set to be blocked by the movable light-blocking layer 302 or the opening portion 304 may be set not to be superposed with the movable light-blocking layer 302.

A formation method of the shutter 300 is described below. A sacrificial layer with a predetermined shape is formed by a photolithography process over the light-blocking layer having the opening portion 304. The sacrificial layer can be formed using an organic resin such as polyimide, acrylic, or the like or an inorganic insulating film or the like such as silicon oxide, silicon nitride, silicon oxynitride, silicon nitride oxide, or the like. Note that in this specification and the like, "silicon oxynitride" contains more oxygen than nitrogen, and "silicon nitride oxide" contains more nitrogen than oxygen. The composition of the oxynitride or the nitride oxide is measured by RBS (rutherford backscattering spectrometry) and HFS (hydrogen forward scattering spectrometry).

Next, a film of a material having a light-blocking property is formed over the sacrificial layer by a printing method, a sputtering method, an evaporation method, or the like, and then is selectively etched so that the shutter 300 is formed. As the material having a light-blocking property, for example, a metal such as chromium, molybdenum, nickel, titanium, copper, tungsten, tantalum, neodymium, aluminum, or silicon, or an alloy or an oxide thereof can be used. Alternatively, the shutter 300 is formed by an inkjet method. The shutter 300 is preferably formed to have a thickness of from 100 nm to 5 μm.

Next, the sacrificial layer is removed, whereby the shutter 300 which can be moved in a space can be formed. Note that, after this, a surface of the shutter 300 is preferably oxidized by oxygen plasma, thermal oxidation, or the like, whereby an oxide film is formed. Alternatively, an insulating film of alumina, silicon oxide, silicon nitride, silicon oxynitride, silicon nitride oxide, DLC (diamond like carbon), or the like is preferably formed on a surface of the shutter 300 by an atomic layer evaporation method or a CVD method. Formation of the insulating film on the shutter 300 can slow down deterioration with time of the shutter 300.

The shutter-shaped light-blocking unit having such a structure is provided between the first display portion having light-emitting elements provided over the light-transmitting support and the second display portion having a light-scattering liquid crystal layer provided over the light-transmitting support described in the above-described embodiments, and thereby a display device capable of easily exhibiting a variety of display modes depending on use applications or situations can be provided.

The structures and the like described in this embodiment can be combined as appropriate with any of the structures and the like described in the other embodiments.

Embodiment 5

In this embodiment, a structure example of an active matrix first display portion provided in the display device having a see-through capability described in any of the above-described embodiments will be described with reference to FIG. 7A and FIG. 7B.

Figure 7A:
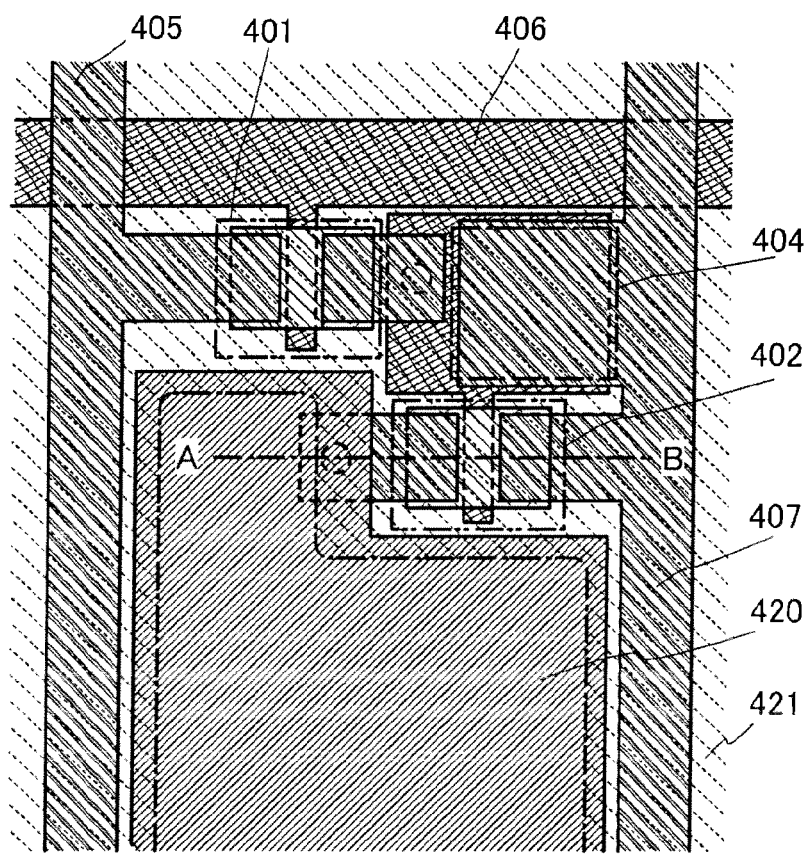
FIGS. 7A and 7B are a plan view and a cross-sectional view illustrating a first display portion in a display device according to one embodiment of the present invention.

FIG. 7A is a plan view illustrating one pixel provided in the active matrix first display portion, and in the first display portion described in this embodiment, such pixels are arranged in matrix. FIG. 7B is a cross-sectional view along the line A-B of FIG. 7A. Note that a part of the structure illustrated in FIG. 7B is not illustrated in FIG. 7A for simplification.

Figure 7B:
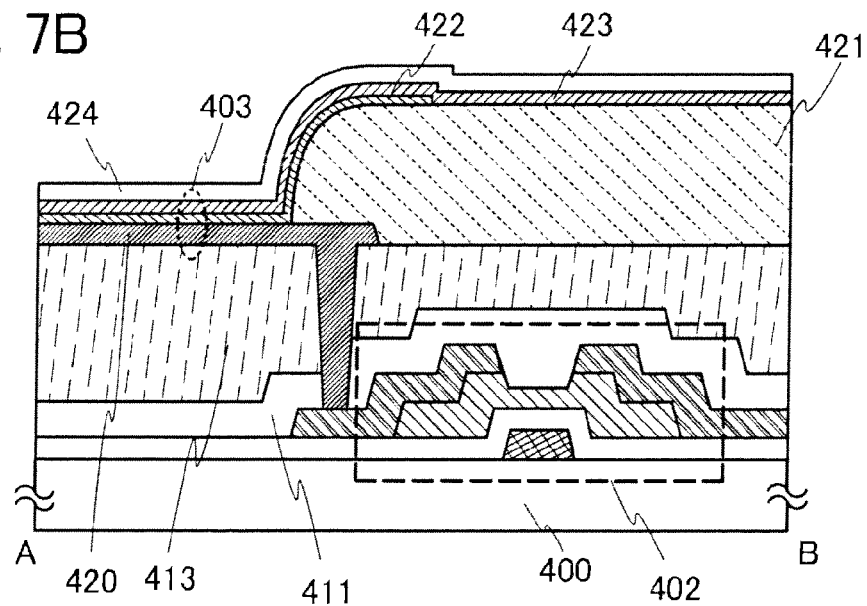

The first display portion illustrated in FIG. 7A and FIG. 7B includes a transistor 401, a transistor 402, a light-emitting element 403, a capacitor 404, a source wiring layer 405, a gate wiring layer 406, and a power source line 407. Here, the transistors 401 and 402 are n-channel thin film transistors.

One of a source electrode and a drain electrode of the transistor 401 is electrically connected to a source wiring layer 405, a gate electrode of the transistor 401 is electrically connected to a gate wiring layer 406, the other of the source electrode and the drain electrode of the transistor 401 is electrically connected to one electrode of a capacitor 404 and a gate electrode of the transistor 402. In addition, one of a source electrode and a drain electrode of the transistor 402 is electrically connected to a power source line 407, and the other of the source electrode and the drain electrode thereof is electrically connected to a first electrode layer 420 of the light-emitting element 403. The other electrode of the capacitor 404 is electrically connected to the power source line 407.

In the first display portion described in this embodiment, the transistor 401, the transistor 402, and the capacitor 404 are provided over the first support 400 and an insulating layer 411 and an insulating layer 413 are provided to cover the transistor 401 and the transistor 402. Note that the first support 400 is a similar one to the first support 100 in the above-described embodiments.

The transistor 401 and the transistor 402 can be similar ones to the transistors described in the above-described embodiments, and are preferably formed using materials having a light-transmitting property. For the details thereof, the above-described embodiments can be referred to. Note that in this embodiment, the transistor 401 and the transistor 402 are, but not limited to, each a channel-etched transistor. For example, a channel protective transistor or a top gate transistor may be used.

The capacitor 404 can be formed including a conductive layer in the same layer as the gate electrodes of the transistor 401 and the transistor 402, an insulating film in the same layer as the gate insulating films of the transistors, and a conductive film in the same layer as the source electrode or drain electrode of the transistors.

The source wiring layer 405, the gate wiring layer 406, and the power source line 407 electrically connected to the transistor 401, the transistor 402, and the capacitor 404 can be ones similar to the wirings in the first display portion described in the above-described embodiments. Therefore, the above-described embodiments can be referred to for details of the wirings.

The insulating layer 411 can be formed using, for example, a material such as silicon oxide, silicon nitride, silicon oxynitride, silicon nitride oxide, aluminum oxynitride, or aluminum oxide. The insulating layer 413 can be formed using an inorganic insulating material or an organic insulating material. Note that the insulating layer formed using a heat-resistant organic insulating material such as an acrylic resin, polyimide, a benzocyclobutene resin, polyamide, or an epoxy resin is suitably used as a planarizing insulating film. Other than such organic insulating materials, it is possible to use a low-dielectric constant material (a low-k material), a siloxane-based resin, phosphosilicate glass (PSG), borophosphosilicate glass (BPSG), or the like. The insulating layer may be formed by stacking a plurality of insulating films formed of these materials.

In addition, the first electrode layer 420 provided over the insulating layer 413, an electroluminescent layer 422 provided over the first electrode layer 420, and a second electrode layer 423 provided to cover the electroluminescent layer 422 constitute the light-emitting element 403.

In this embodiment, since the transistor 402 in the pixel is n-channel, preferably, the first electrode layer 420 as a pixel electrode layer is used as cathode and the second electrode layer 423 is as an anode. The first electrode layer 420 and the second electrode layer 423 can be formed using any of the light-transmitting conductive materials described in the above-described embodiments. Therefore, the above-described embodiments can be referred to for details thereof.

The electroluminescent layer 422 may be formed using a single layer or a plurality of layers stacked. When the electroluminescent layer includes a plurality of layer, for example, a cathode, an electron-injection layer, an electron-transport layer, a light-emitting layer, a hole-transport layer, a hole-injection layer, and an anode are stacked in this order. It is not necessary to form all of these layers.

In addition, a partition 421 is provided over the first electrode layer 420 so as to form an opening portion. The partition 421 is preferably formed such that the sidewall of the opening portion has an inclined surface having a continuous curvature.

Note that the partition 421 may be formed using an inorganic insulating material such as silicon oxide, silicon nitride, silicon oxynitride, aluminum oxide, aluminum nitride, aluminum oxynitride; other inorganic insulating materials; acrylic acid, methacrylic acid, or a derivative thereof; a heat-resistant polymer, such as polyimide, aromatic polyamide, polybenzimidazole; or a siloxane resin. Further, the following resin materials can be also be used: vinyl resins such as polyvinyl alcohol and polyvinyl butyral, an epoxy rein, a phenol resin, a novolac resin, an acrylic rein, a melamine resin, and a urethane resin.

Further, a protective film 424 may be formed over the second electrode layer 423 and the partition 421 in order to prevent entry of oxygen, hydrogen, moisture, carbon dioxide, or the like into the light-emitting element 403. As the protective film 424, a silicon nitride film, a silicon nitride oxide film, a DLC film, or the like can be formed.

The structures and the like described in this embodiment can be combined as appropriate with any of the structures and the like described in the other embodiments.

Embodiment 6

In this embodiment, a structure example of a passive matrix first display portion provided in the display device having a see-through capability described in any of the above-described embodiments will be described with reference to FIG. 8A to FIG. 8C.

Figure 8A:
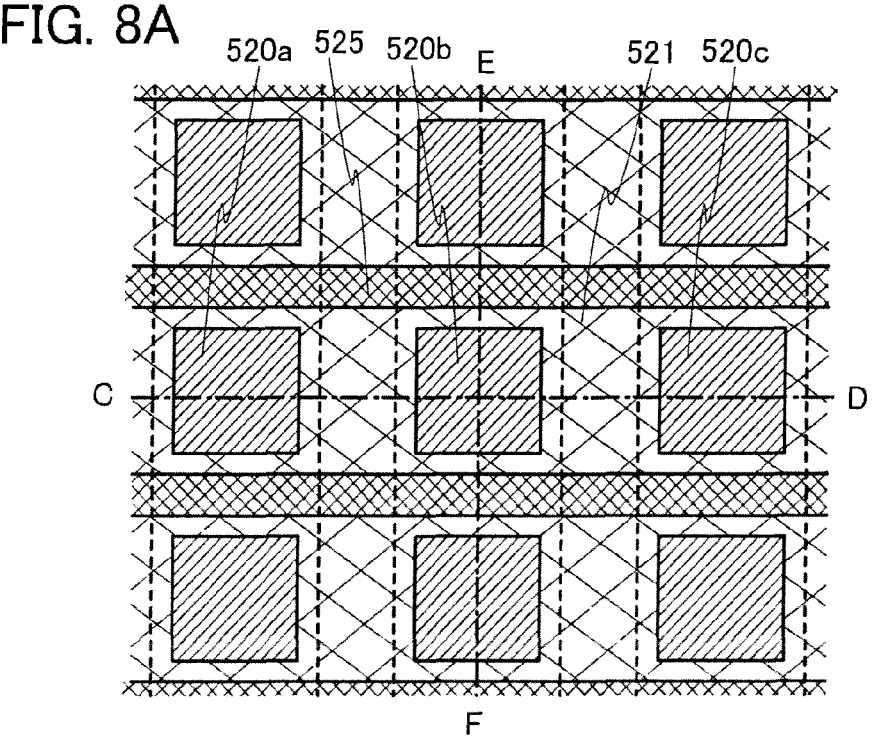
FIGS. 8A, 8B, and 8C are a plan view and cross-sectional views illustrating a first display portion in a display device according to one embodiment of the present invention.

FIG. 8A is a plan view illustrating the passive matrix first display portion. FIG. 8B is a cross-sectional view along the line C-D of FIG. 8A and FIG. 8C is a cross-sectional view along the line E-F of FIG. 8A. Note that parts of the structures illustrated in FIG. 8B and FIG. 8C are not illustrated in FIG. 8A for simplification.

Figure 8B:
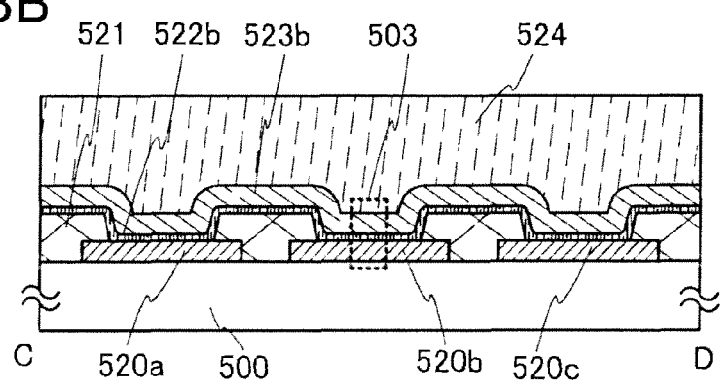
Figure 8C:
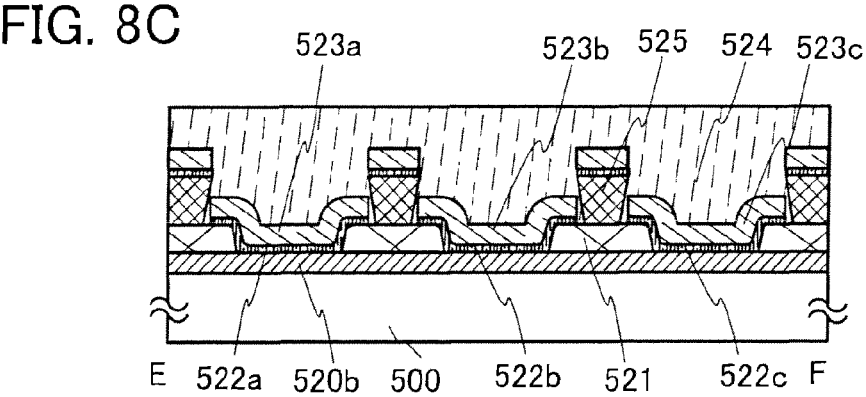

The first display portion illustrated in FIG. 8A to FIG. 8C includes, over a first support 500, a first electrode layer 520a to a first electrode layer 520c extending in a first direction (the column direction), a partition 521 having an opening portion over the first electrode layer 520a to the first electrode layer 520c, a partition 525 extending in a second direction (the row direction) perpendicular to the first direction over the partition 521, an electroluminescent layer 522a to an electroluminescent layer 522c extending in the second direction over the first electrode layer 520a to the first electrode layer 520c and the partition 521, and a second electrode layer 523a to a second electrode layer 523c extending in the second direction over the electroluminescent layer 522a to the electroluminescent layer 522c.

At portions where the first electrode layer 520a to the first electrode layer 520c and the second electrode layer 523a to the second electrode layer 523c intersect with each other and sandwich the electroluminescent layer 522a to the electroluminescent layer 522c in the opening portions of the partition 521, the light-emitting elements 503 are formed and correspond to pixel regions of the first display portion.

Either the first electrode layer 520a to the first electrode layer 520c or the second electrode layer 523a to the second electrode layer 523c are used as cathodes and the rest are used as anodes. The first electrode layer 520a to the first electrode layer 520c and the second electrode layer 523a to the second electrode layer 523c can be formed using any of the light-transmitting conductive materials in the above-described embodiments. Therefore, the above-described embodiments can be referred to for details. Here, when the first display portion is a passive matrix one, the wiring width can be larger than that of an active matrix one, and thus the wiring resistance can be easily lowered. Therefore, by using the light-transmitting conductive materials for the first electrode layer 520a to the first electrode layer 520c and the second electrode layer 523a to the second electrode layer 523c, the aperture ratio in the first display portion can be easily increased.

The electroluminescent layer 522a to the electroluminescent layer 522c may be formed with a single layer or a plurality of layers stacked. When the electroluminescent layers each include a plurality of layers, for example, a cathode, an electron-injection layer, an electron-transport layer, a light-emitting layer, a hole-transport layer, a hole-injection layer, and an anode are stacked in this order. It is not necessary to form all of these layers.

In addition, the partition 521 is preferably formed such that the sidewall of the opening portion has an inclined surface having a continuous curvature.

The partition 525 has a function of dividing the second electrode layer 523a to the second electrode layer 523c formed over the partition 521 so as to be discontinuous. Side walls of the partition 525 slope so that a distance between one side wall and the other side wall becomes narrower toward a substrate surface. That is, the shape of a cross section of the partition 525 in the direction of its short side is trapezoid, where the bottom side (the side is in the same direction as the partition 521 and in contact with the partition 521) is shorter than the top side (the side is in the same direction as the partition 521 and is not in contact with the partition 521). Since the partition 525 has a so-called inversely tapered shape, the second electrode layer 523a to the second electrode layer 523c are divided by the partition 525 in a self-aligned manner and can be selectively formed over the first electrode layer 520a to the first electrode layer 520c. Thus, adjacent light-emitting elements are divided without being processed by etching, resulting in prevention of electrical failure such as a short circuit between the light-emitting elements.

For the partition 521 and the partition 525, materials similar to the partition 421 described in the above-embodiments can be used. Therefore, the above-described embodiments can be referred to for details thereof.

Further, a protective film 524 may be formed over the second electrode layer 523a to the second electrode layer 523c, the partition 521 and the partition 525 in order to prevent entry of oxygen, hydrogen, moisture, carbon dioxide, or the like into the light-emitting element 503. As the protective film 524, a silicon nitride film, a silicon nitride oxide film, a DLC film, or the like can be formed.

The structures and the like described in this embodiment can be combined as appropriate with any of the structures and the like described in the other embodiments.

Embodiment 7

In this embodiment, a structure example of an active matrix second display portion provided in the display device having a see-through capability described in any of the above-described embodiments will be described with reference to FIG. 9A and FIG. 9B.

Figure 9A:
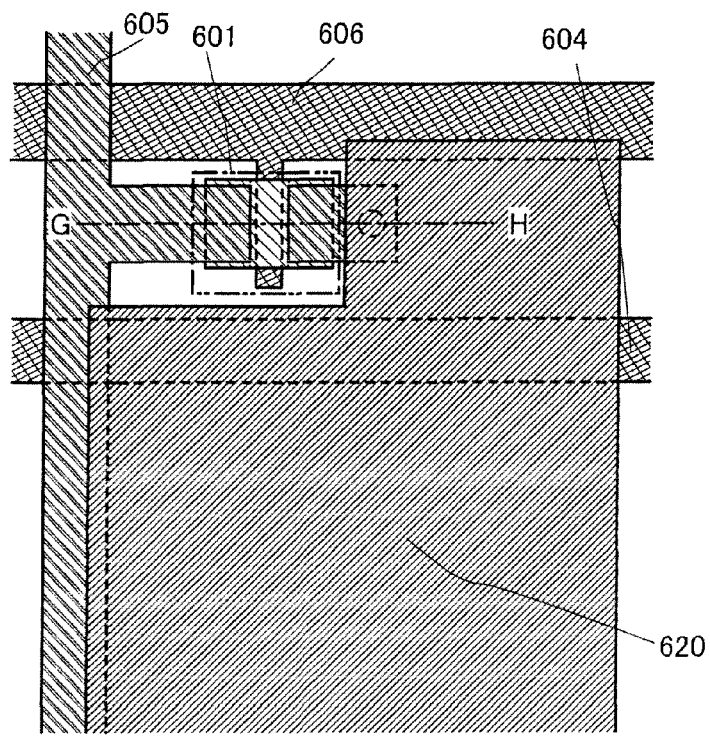
FIGS. 9A and 9B are a plan view and a cross-sectional view illustrating a second display portion in a display device according to one embodiment of the present invention.

FIG. 9A is a plan view illustrating one pixel provided in the active matrix second display portion, and in the second display portion described in this embodiment, such pixels are arranged in matrix. FIG. 9B is a cross-sectional view along the line G-H of FIG. 9A. Note that a part of the structure illustrated in FIG. 9B is not illustrated in FIG. 9A for simplification.

Figure 9B:
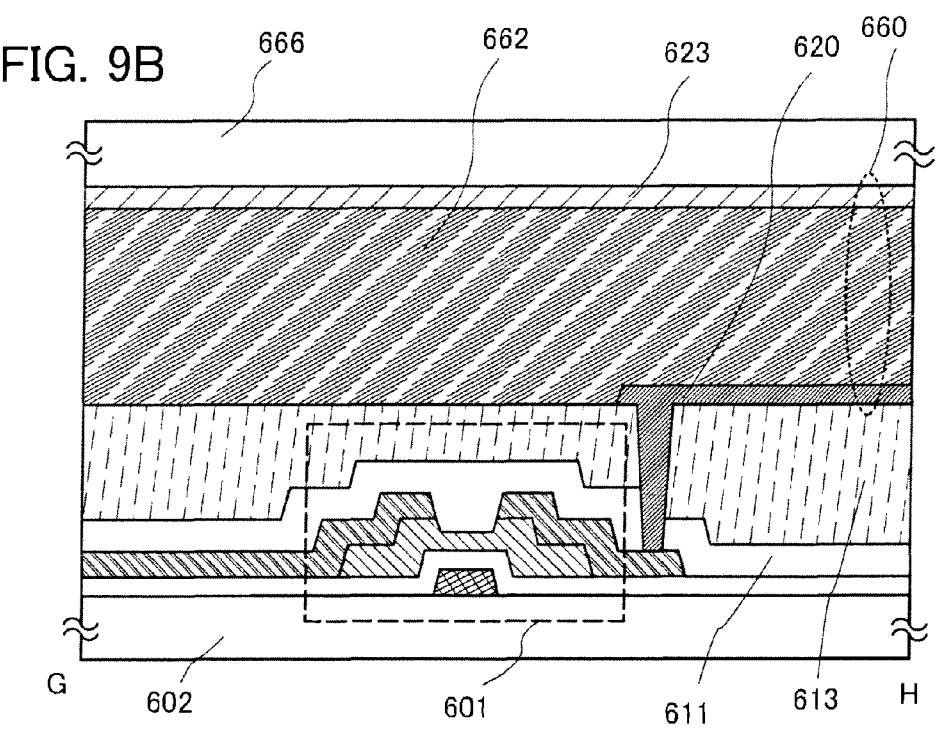

The second display portion illustrated in FIG. 9A and FIG. 9B includes a transistor 601, a capacitor wiring layer 604, a source wiring layer 605, and a gate wiring layer 606.

One of a source electrode and a drain electrode of the transistor 601 is electrically connected to a source wiring layer 605, a gate electrode of the transistor 601 is electrically connected to a gate wiring layer 606, and the other of the source electrode and the drain electrode thereof is electrically connected to a first electrode layer 620 of a liquid crystal element 660.

In the second display portion described in this embodiment, the transistor 601 is provided over the second support 602, and an insulating layer 611 and an insulating layer 613 are provided to cover the transistor 601. Note that the second support 602 is a similar one to the second support 102 described in the above-described embodiments.

The transistor 601 can be a similar one to the transistors described in the above-described embodiments, and is preferably formed using a material having a light-transmitting property. For the details thereof, the above-described embodiments can be referred to. Note that in this embodiment, the transistor 601 is, but not limited to, each a channel-etched transistor. For example, a channel protective transistor or a top gate transistor may be used.

The capacitor wiring layer 604 includes a conductive film in the same layer as the gate electrode of the transistor 601, and overlaps with the first electrode layer 620 with an insulating film in the same layer as the gate insulating film of the transistor 601 interposed therebetween, so that a capacitor is formed.

Note that the capacitor wiring layer 604, the source wiring layer 605, and the gate wiring layer 606 can be similar to the source wiring layer 405, the gate wiring layer 406, and the power source line 407 described in the above-described embodiments. Therefore, the above-described embodiment can be referred to for details thereof.

In addition, the insulating layer 611 and the insulating layer 613 can be similar to the insulating layer 411 and the insulating layer 413 described in the above-described embodiments. Therefore, the above-described embodiment can be referred to for details thereof.

The first electrode layer 620 provided over the insulating layer 613, the liquid crystal layer 662 provided over the first electrode layer 620, and the second electrode layer 623 provided over the liquid crystal layer 662 constitute the liquid crystal element 660.

The first electrode layer 620 serving as a pixel electrode and the second electrode layer 623 serving as a common electrode provided in a support portion 666 can be formed using any of the light-transmitting conductive materials described in the above-described embodiments. Therefore, the above-described embodiment can be referred to for details thereof. In addition, the support portion 666 can be one similar to the second support 602.

Further, the MEMS structure portion 106a and the MEMS driving element portion 106b described in the above-described embodiments can be provided over the support portion 666.

In addition, the liquid crystal layer 662 is a light-scattering liquid crystal layer that conducts white display (bright display) using light scattered by liquid crystal. For example, a polymer dispersed liquid crystal (PDLC) or a polymer network liquid crystal (PNLC) is used for such a light-scattering liquid crystal. The liquid crystal layer using such a liquid crystal has a structure in which liquid crystal grains are dispersed in a polymer layer forming a polymer network.

In addition, the liquid crystal layer 662 may be provided therein with a columnar or spherical spacer so that the thickness of the liquid crystal layer 662 can be controlled.

The structures and the like described in this embodiment can be combined as appropriate with any of the structures and the like described in the other embodiments.

Embodiment 8

In this embodiment, a structure example of a passive matrix second display portion provided in the display device having a see-through capability described in any of the above-described embodiments will be described with reference to FIG. 10A and FIG. 10B.

Figure 10A:
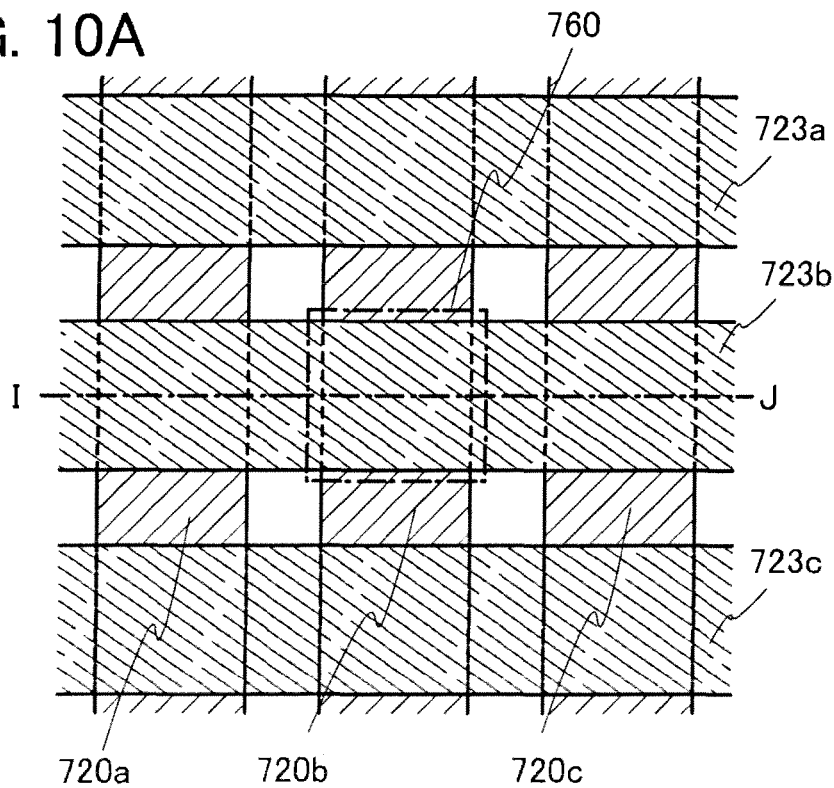
FIGS. 10A and 10B are a plane view and a cross-sectional view illustrating a second display portion in a display device according to one embodiment of the present invention.

FIG. 10A is a plan view illustrating the passive matrix second display portion. FIG. 10B is a cross-sectional view along the line I-J of FIG. 10A. Note that a part of the structure illustrated in FIG. 10B is not illustrated in FIG. 10A for simplification.

Figure 10B:
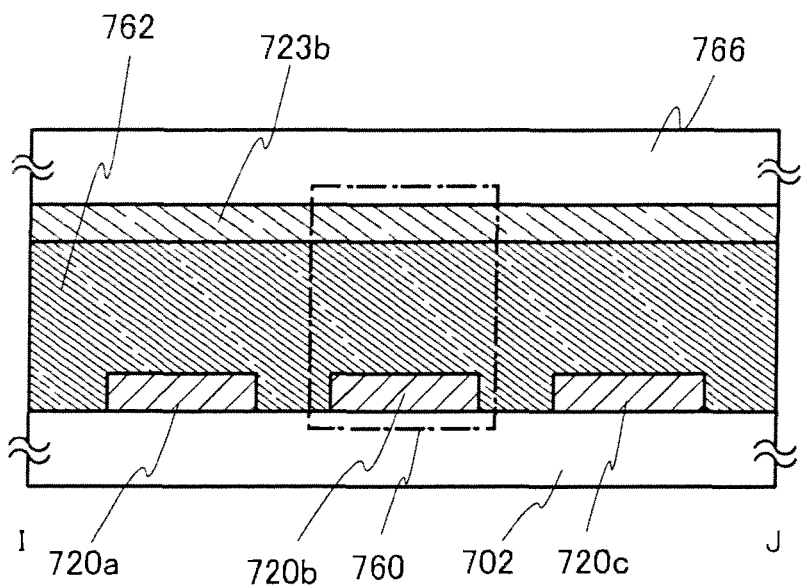

The second display portion illustrated in FIG. 10A and FIG. 10B includes the first electrode layer 720a to the first electrode layer 720c extending in a first direction (the column direction) over the second support 702, a second electrode layer 723a to a second electrode layer 723c extending in a second direction (the row direction) perpendicular to the first direction over a support portion 766, and a liquid crystal layer 762 sandwiched between the first electrode layer 720a to the first electrode layer 720c and the second electrode layer 723a to the second electrode layer 723c.

Note that the second support 702 and the support portion 766 can be ones similar to the second support 602 and the support portion 666 described in the above-described embodiment.

In addition, the MEMS structure portion 106a and the MEMS driving element portion 106b can be provided over the support portion 766.

At each of portions where the first electrode layer 720a to the first electrode layer 720c intersect with the second electrode layer 723a to the second electrode layer 723c with the liquid crystal layer 762 sandwiched therebetween, a liquid crystal element 760 is formed and corresponds to a pixel region of the second display portion.

The first electrode layer 720a to the first electrode layer 720c, and the second electrode layer 723a to the second electrode layer 723c can be formed using any of the light-transmitting conductive materials described in the above-described embodiments. Therefore, the above-described embodiments can be referred to for details thereof. Here, when the second display portion is a passive matrix one, the wiring width can be larger than that of an active matrix one, and thus the wiring resistance can be easily lowered. Therefore, by using the light-transmitting conductive materials for the first electrode layer 720a to the first electrode layer 720c and the second electrode layer 723a to the second electrode layer 723c, the aperture ratio in the second display portion can be easily increased.

Further, the liquid crystal layer 762 can be one similar to the liquid crystal layer 662 described in the above-described embodiment. In addition, the liquid crystal layer 762 may be provided therein with a columnar or spherical spacer so that the thickness of the liquid crystal layer 762 can be controlled.

Note that the first electrode layer 720a to the first electrode layer 720c are formed with one first electrode layer and the second electrode layer 723a to the second electrode layer 723c are formed with one second electrode layer, so that the second display portion without pixels provided, as described in Embodiment 1, can be provided.

The structures and the like described in this embodiment can be combined as appropriate with any of the structures and the like described in the other embodiments.

Embodiment 9

In this embodiment, an example of application of the display device described in any of the above-described embodiments will be described with reference to FIGS. 11A to 11C.

Figure 11A:
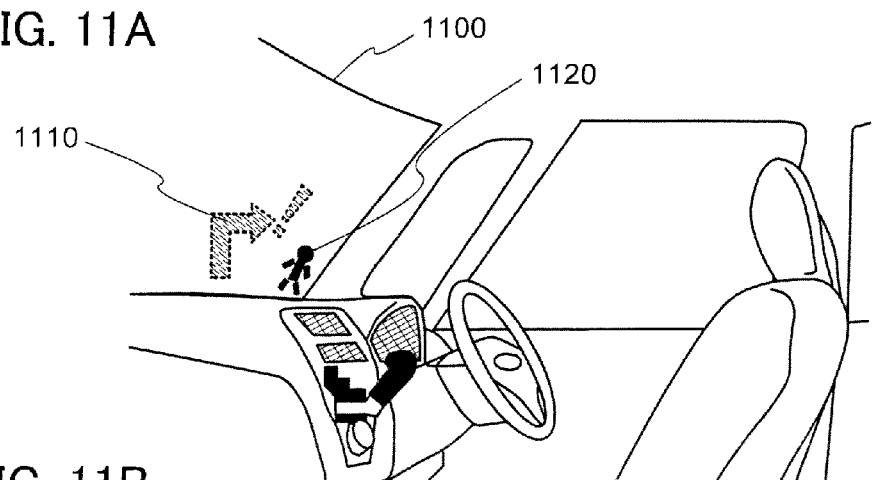
FIGS. 11A to 11C are drawings illustrating application examples of a display device according to one embodiment of the present invention.

FIG. 11A illustrates an example in which the display device in any of the above-described embodiments is applied to a windshield on a car. In FIG. 11A, a display device 1100 is provided such that a first display portion faces the inside of the car. The display device 1100 is in the see-through display mode illustrated in FIG. 2C, and an image 1110 produced by light-emitting elements of the first display portion is displayed and an image 1120 on the other side of the display device 1100 is viewed. In that case, the image 1120 shows a human figure outside the car, and the image 1110 shows a warning signal about the human figure. In this manner, with the use of the display device in accordance with the disclosed invention, a human being can see the object while information on the object on the other side of the display device is displayed.

Alternatively, for example, in a case where the image 1120 and the image 1110 are overlapped and thus the image 1110 is difficult to see, only a portion of the image 1110 can be in the black display mode illustrated in FIG. 2A. In this manner, the image 1120 cannot be transmitted from the other side of the image 1110, so that the image 1110 can be seen clearly.

The display device 1100 is not necessarily provided over the entire windshield, and it is possible that the display device 1100 is provided over only a portion of the image 1110 and the other portion of the windshield is used as a normal windshield.

Figure 11B:
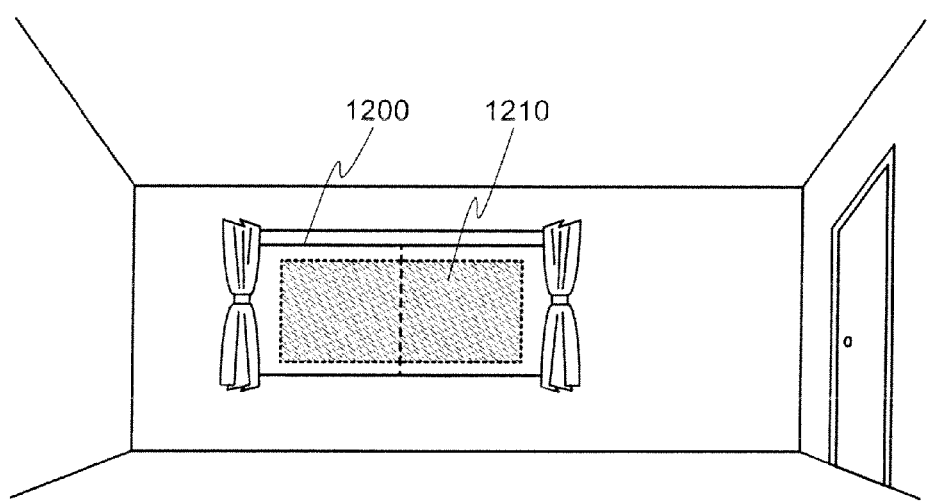

FIG. 11B illustrates an example in which the display device in any of the above-described embodiments is applied to a window glass. In FIG. 11B, a display device 1200 is provided such that the first display portion faces the inside of the room. The display device 1200 is in the black display mode illustrated in FIG. 2A or the white display mode illustrated in FIG. 2B, and an image 1210 produced by light-emitting elements of the first display portion is displayed. In that case, the image 1210 is, for example, an image on a television show.

Alternatively, in a case where no image 1210 is displayed on the display device 1200, the display device 1200 is in transparent display mode, and thus the display device 1200 can be used as a normal window glass. In this manner, the display modes of the display device 1200 are switched, so that the display device 1200 can be a television device, a display device, or a window glass.

Further, the double-side display mode as illustrated in FIG. 5A is employed, so that different images can be seen both inside and outside the room.

The display device 1200 is not necessarily provided for the entire window glass, and it is possible that the display device 1200 is provided over only a portion of the image 1210 and the other portion of the window glass is used as a normal window glass.

Figure 11C:
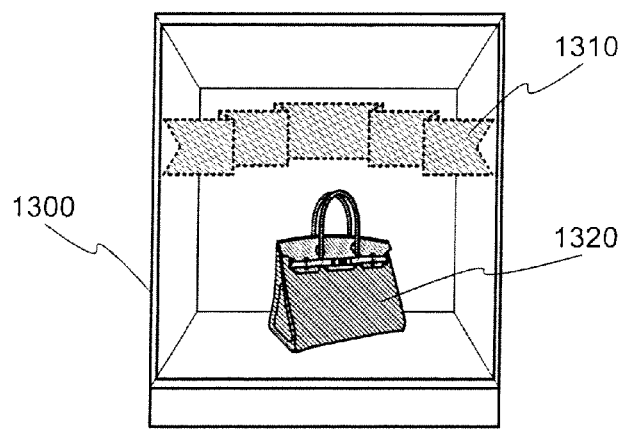

FIG. 11C illustrates an example in which the display device in any of the above-described embodiments is applied to a showcase in a store window. In FIG. 11C, a display device 1300 is provided such that the first display portion faces the outside of the showcase. The display device 1300 is in the see-through display mode illustrated in FIG. 2C, and an image 1310 produced by light-emitting elements of the first display portion is displayed and a decorated object 1320 inside the display device 1300 is viewed. Here, the decorated object 1320 is a bag set in the store window and the image 1310 is an image of a ribbon decorating the bag. In this manner, with the use of the display device of the disclosed invention, the object on the other side of the display device can be seen with the object decorated with the image.

Further, by making only a portion of the image 1310 be in the black display mode illustrated in FIG. 2A, the decorated object 1320 can prevented from being seen from behind the image 1310, and thus decoration by the image 1310 becomes more realistic.

The display device 1300 is not necessarily provided over the entire showcase in the store window, and it is possible that the display device 1300 is provided over only a portion of the image 1310 and the other portion of the showcase is used as a normal showcase.

The structures and the like described in this embodiment can be combined as appropriate with any of the structures and the like described in the other embodiments.

This application is based on Japanese Patent Application serial no. 2011-001842 filed with Japan Patent Office on Jan. 7, 2011 the entire contents of which are hereby incorporated by reference.

What is claimed is:

1. A display device comprising:
   a first support having a light-transmitting property;
   a first display portion on the first support, the first display portion comprising a plurality of pixels each including a dual-emission type light-emitting element;
   a second support having a light-transmitting property opposite to the first support;
   a second display portion on the second support, the second display portion comprising a liquid crystal layer;
   a plurality of shutters each including a light-blocking layer including an opening portion and a movable light-blocking layer; and
   a sealant between the first support and the second support,
   wherein the sealant bonds the first support and the second support,
   wherein the first display portion and the second display portion are between the first support and the second support,
   wherein the movable light-blocking layer is capable of blocking light passing through the opening portion,
   wherein the opening portion is superposed with a part of the plurality of pixels, and
   wherein when seen from a second support side, the second display portion is configured to display an image by using the first display portion as a backlight of the second display portion when the movable light-blocking layer is not superposed with the opening portion.

2. The display device according to claim 1, wherein the dual-emission type light-emitting element is an organic EL element.

3. The display device according to claim 1, wherein the liquid crystal layer comprises a polymer dispersed liquid crystal material.

4. The display device according to claim 1 further comprising:
   a space including the first display portion and the second display portion between the first support and the second support,
   wherein the space is sealed with the sealant.

5. A display device comprising:
   a first support having a light-transmitting property;
   a first display portion on the first support, the first display portion comprising a plurality of pixels each including a dual-emission type light-emitting element;
   a second support having a light-transmitting property opposite to the first support;
   a second display portion on the second support, the second display portion comprising a liquid crystal layer;
   a plurality of shutters each including a light-blocking layer including an opening portion and a movable light-blocking layer; and
   a sealant between the first support and the second support,
   wherein the sealant bonds the first support and the second support, wherein the first display portion and the second display portion are between the first support and the second support, wherein the movable light-blocking layer is capable of blocking light passing through the opening portion, wherein the opening portion is superposed with a part of the plurality of pixels, wherein the plurality of shutters are between the first display portion and the second display portion, and wherein the liquid crystal layer is overlapped with the dual-emission type light-emitting element through the opening portion.

6. The display device according to claim 5, wherein one of the plurality of shutters comprises a MEMS.

7. The display device according to claim 5, wherein the dual-emission type light-emitting element is an organic EL element.

8. The display device according to claim 5, wherein the liquid crystal layer comprises a polymer dispersed liquid crystal material.

9. The display device according to claim 5, wherein one of the plurality of pixels is provided with the movable light-blocking layer.

10. The display device according to claim 5, wherein the plurality of pixels and the plurality of shutters are respectively provided in matrix, and light emitted from one group of the plurality of pixels aligned in a column direction is blocked by one movable light-blocking layer.

11. The display device according to claim 5, wherein the plurality of pixels and the plurality of shutters are respectively provided in matrix, and light emitted from one group of the plurality of pixels aligned in a row direction is blocked by one movable light-blocking layer.

12. The display device according to claim 5, wherein a background of the first display portion is black display when the movable light-blocking layer is superposed with the opening portion.

13. The display device according to claim 5, wherein a background of the first display portion is white display when the movable light-blocking layer is not superposed with the opening portion and the second display portion is in a light-scattering state.

14. The display device according to claim 5, wherein information on an object on the other side of the second support is displayed on the background of the first display portion when the movable light-blocking layer is not superposed with the opening portion and the second display portion is in a light-transmitting state.

15. The display device according to claim 5 further comprising:

a space including the first display portion and the second display portion between the first support and the second support, wherein the space is sealed with the sealant.

16. The display device according to claim 1, wherein the first display portion has a light-transmitting property when the dual-emission type light-emitting element is in a non-light-emission state; and wherein the second display portion has a light-transmitting property when the liquid crystal layer is in a light-transmitting state.

17. The display device according to claim 5, wherein the first display portion has a light-transmitting property when the dual-emission type light-emitting element is in a non-light-emission state; and wherein the second display portion has a light-transmitting property when the liquid crystal layer is in a light-transmitting state.

18. The display device according to claim 1, wherein the liquid crystal layer is a light-scattering liquid crystal layer.

19. The display device according to claim 5, wherein the liquid crystal layer is a light-scattering liquid crystal layer.

20. The display device according to claim 1, wherein the liquid crystal layer is overlapped with the dual-emission type light-emitting element through the opening portion.

* * * * *